United States Patent [19]

Ricco et al.

[11] Patent Number: 5,588,796
[45] Date of Patent: Dec. 31, 1996

[54] APPARATUS AND METHOD FOR HANDLING INFORMATION STORAGE MEDIA

[75] Inventors: Gary C. Ricco, Redding; Michael D. Shannon, Sunnyvale; Tyler R. Wilkins, Menlo Park, all of Calif.

[73] Assignee: ATG Cygnet Inc., San Jose, Calif.

[21] Appl. No.: 229,406

[22] Filed: Apr. 18, 1994

[51] Int. Cl.$^6$ .................................................. B25J 15/00
[52] U.S. Cl. .................... 414/741; 74/89.15; 294/99.1; 294/100; 414/751; 414/783
[58] Field of Search ............................. 294/110.2, 99.1, 294/119.1, 100, 116; 414/728, 741, 751; 763/783, 786; 74/89.15, 665 F, 665 G

[56] References Cited

U.S. PATENT DOCUMENTS

| | | | |
|---|---|---|---|
| 4,135,245 | 1/1979 | Kemplin et al. | 364/520 |
| 4,170,030 | 10/1979 | Castrodale et al. | 360/98 |
| 4,173,427 | 11/1979 | Beuch et al. | 414/751 |
| 4,417,258 | 11/1983 | Tribolet et al. | 364/139 R |
| 4,566,087 | 1/1986 | Kraft | 369/34 |
| 4,573,129 | 2/1986 | Tribolet et al. | 364/520 |
| 4,594,700 | 6/1986 | Takahashi et al. | 369/39 |
| 4,607,354 | 8/1986 | Ishibashi et al. | 369/39 |
| 4,608,679 | 8/1986 | Rudy et al. | 369/36 |
| 4,614,474 | 9/1986 | Sudo | 414/281 |
| 4,675,856 | 6/1987 | Rudy et al. | 369/36 |
| 4,685,095 | 8/1987 | Rudy et al. | 369/36 |
| 4,730,292 | 3/1988 | Hasegawa et al. | 369/39 |
| 4,742,504 | 5/1988 | Takasuka et al. | 369/36 |
| 4,786,995 | 11/1988 | Stupeck et al. | 360/75 |
| 4,787,074 | 11/1988 | Deck et al. | 369/36 |
| 4,797,865 | 1/1989 | Imai et al. | 369/39 |
| 4,815,055 | 3/1989 | Fago, Jr. | 369/36 |
| 4,815,056 | 3/1989 | Toi et al. | 369/36 |
| 4,817,070 | 3/1989 | Hug et al. | 369/36 |
| 4,817,071 | 3/1989 | Carlson et al. | 369/36 |
| 4,827,463 | 5/1989 | Motoyoshi et al. | 369/36 |
| 4,839,758 | 6/1989 | Honjoh | 360/99.06 |
| 4,853,916 | 8/1989 | Tomita | 369/36 |
| 4,855,980 | 8/1989 | Hug et al. | 369/36 |
| 4,860,133 | 8/1989 | Baranski | 360/92 |
| 4,878,137 | 10/1989 | Yamashita et al. | 360/98.05 |
| 4,879,615 | 11/1989 | Teranishi et al. | 369/34 |
| 4,903,252 | 2/1990 | Tanaka et al. | 369/36 |
| 4,910,619 | 3/1990 | Suzuki et al. | 360/92 |
| 4,912,575 | 3/1990 | Shiosaki | 360/71 |
| 4,918,548 | 4/1990 | O'Donnell et al. | 360/92 |
| 4,932,280 | 6/1990 | Becker et al. | 74/665 G |
| 4,945,429 | 7/1990 | Munro et al. | 360/92 |
| 4,998,232 | 3/1991 | Methlie et al. | 369/36 |
| 5,014,255 | 5/1991 | Wanger | 369/36 |
| 5,057,758 | 10/1991 | Oliver et al. | 318/603 |
| 5,101,387 | 3/1992 | Wanger et al. | 369/36 |
| 5,128,912 | 7/1992 | Hug et al. | 369/38 |
| 5,184,336 | 2/1993 | Wanger et al. | 369/34 |

FOREIGN PATENT DOCUMENTS

| | | |
|---|---|---|
| 2620554A1 | 3/1989 | France . |
| 56-124160 | 9/1981 | Japan . |
| 59-117755 | 7/1984 | Japan . |
| 60-224144 | 11/1985 | Japan . |

OTHER PUBLICATIONS

IBM 3494 Tape Library Dataserver Marketing Brochure (Dated 1993).

Primary Examiner—Karen B. Merritt
Assistant Examiner—Janice L. Krizek
Attorney, Agent, or Firm—Flehr, Hohbach, Test, Albritton & Herbert

[57] ABSTRACT

A media cartridge handling apparatus and method are disclosed which includes a frictional cartridge gripping feature and an optional cartridge flipping feature.

34 Claims, 17 Drawing Sheets

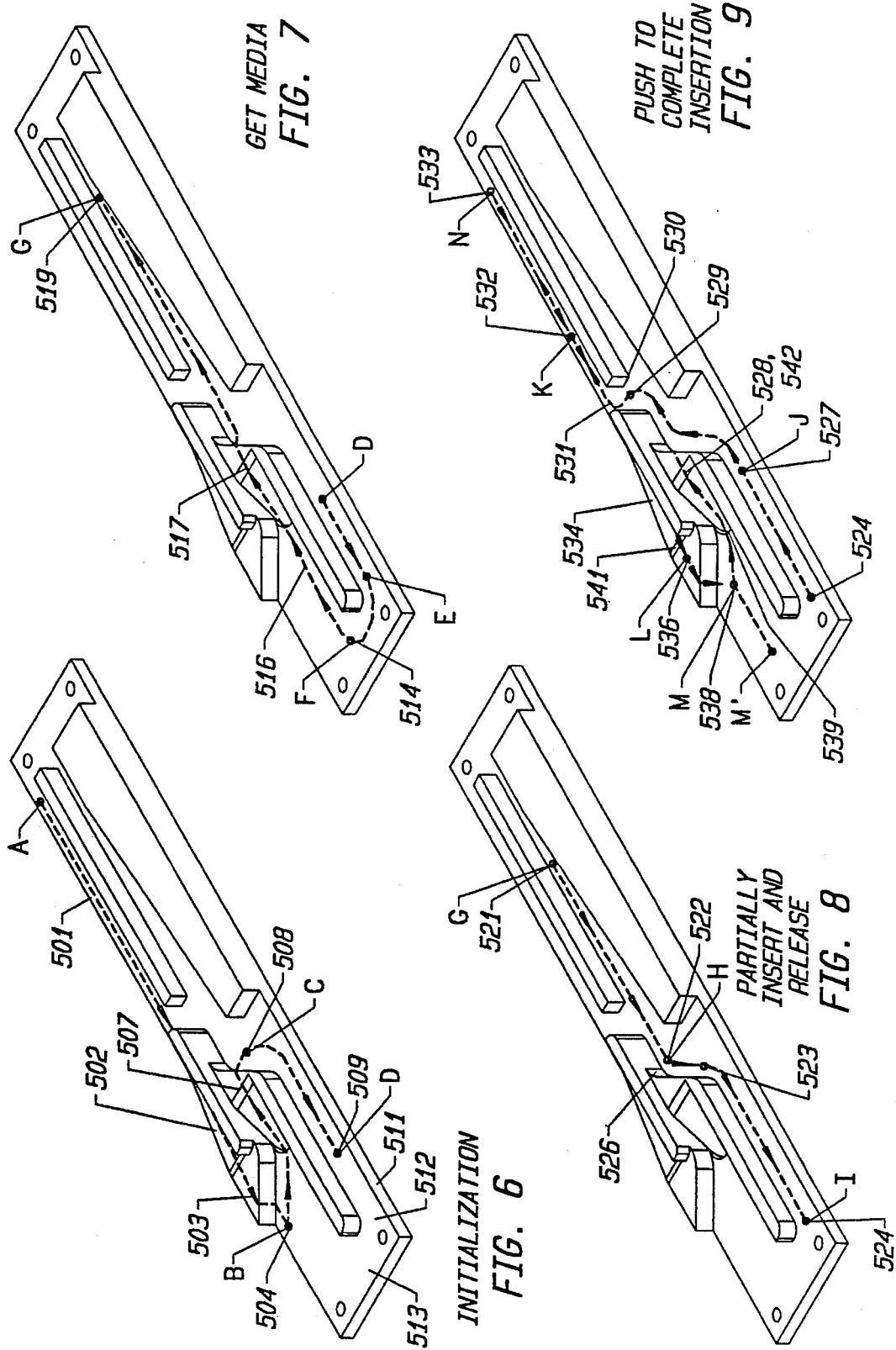

(DETAIL A)

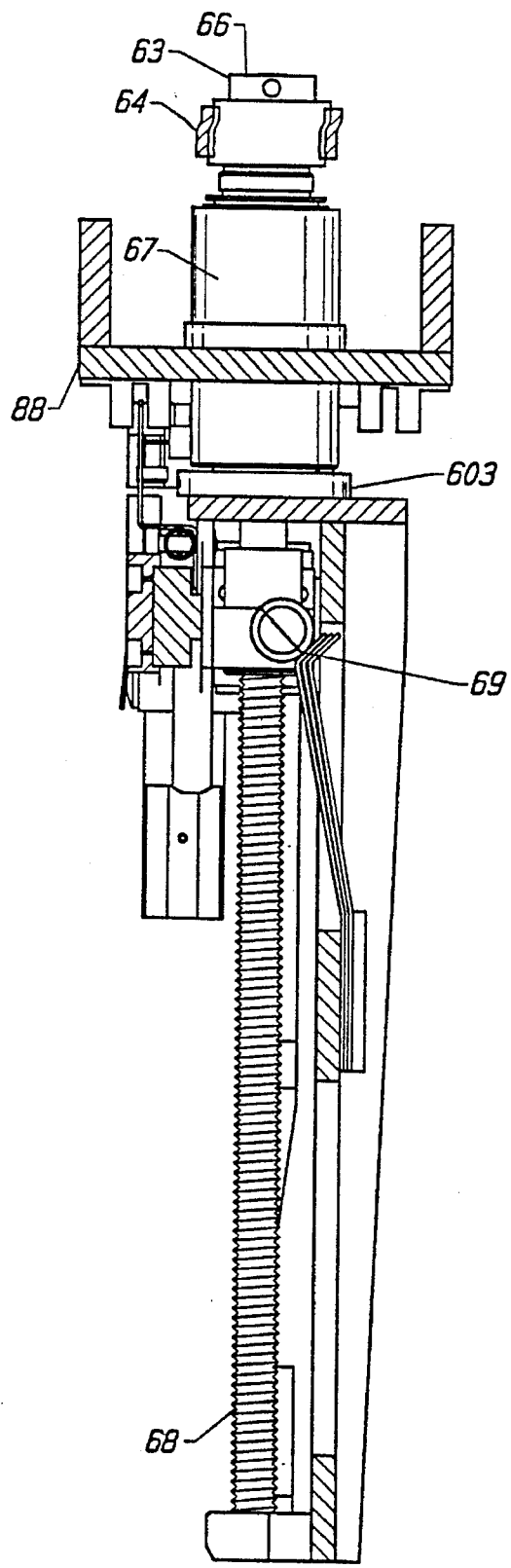
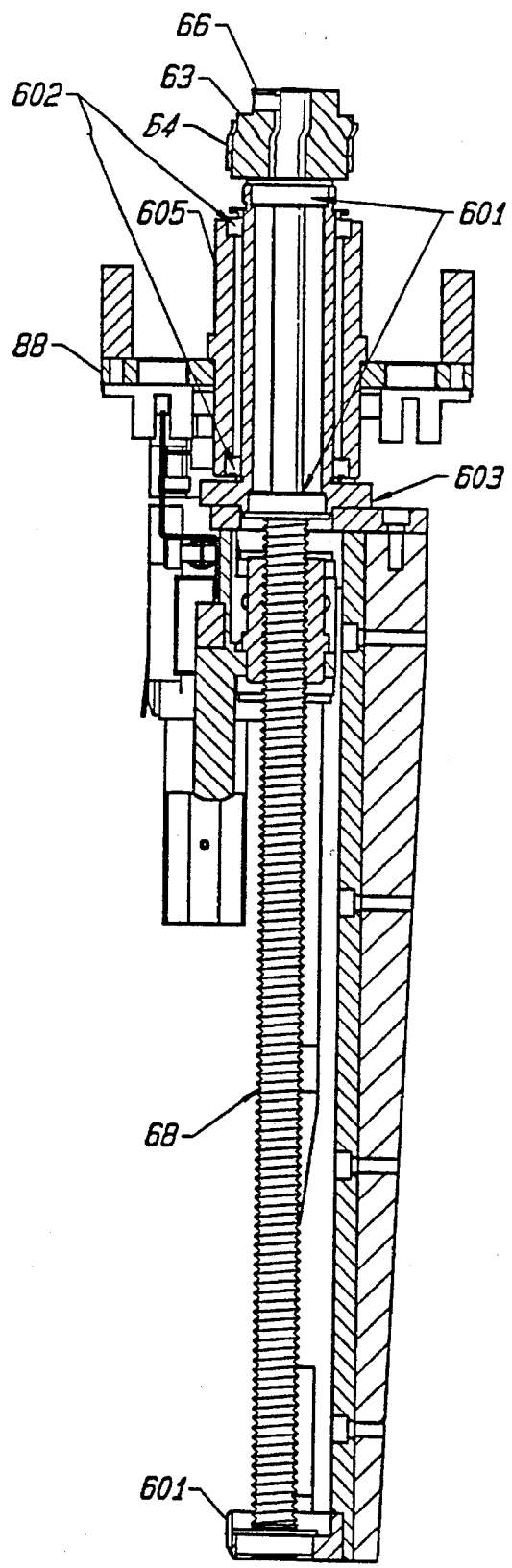
FIG. 37B                    FIG. 37A 5,588,796

APPARATUS AND METHOD FOR HANDLING INFORMATION STORAGE MEDIA

FIELD OF THE INVENTION

This invention relates generally to apparatus and methods for handling information storage media, and more particularly to apparatus and methods for gripping and flipping information storage media housed in cassettes.

BACKGROUND OF THE INVENTION

Information storage media are typically mounted in parallelepiped-shaped cartridges. Media reading and recording devices generally receive a media cartridge which is to be read through a narrow slot provided on the front surface of the device. At the present time, many types of media are manually loaded into media drives to play or record information. This approach is impractical for large databases or information storage libraries. For such media storage libraries it is preferable to provide an automated media storage system for storing the media at known locations, and media handling system which is capable of getting a media cassette from a known storage location and inserting the media cassette into a media drive unit, possibly with a 180 degree flip of the media to facilitate playing both sides of the media with a single sided drive unit.

To make such units as affordable as possible both for purchase and to maintain, the number and complexity of components should be minimized. For example, it is desirable to minimize the number of motors, clutches, and other expensive electronic components.

SUMMARY OF THE INVENTION

The present invention is directed to a media handling apparatus and method which is adapted to engage a media cartridge positioned in a storage location or media drive unit and to extract the media from that location and insert the media into the same, possibly with a 180 degree flip of the media, and insert the media into a second or the same location. The invention provides a cartridge gripping mechanism whose operation is passively directed by mechanical camming surfaces and the presence or absence of media cartridge held between cradling frictional gripping jaws. The surfaces of the jaws may optionally be treated to alter the frictional characteristics of the underlying jaw material. The gripping surfaces are adaptable to any type of media having the general parallelepiped shape and no particular surface features such as notches or protuberances in the media cartridge are required for operation. The gripper mechanism size and relative dimensions may be adapted to the type of media cartridge in use. Apparatus and method for flipping a media cartridge 180 degrees is also provided in the present invention. This flipping operation uses the same motor that drives the gripper means by employing a spindle within a spindle to eliminate the need for multiple motors and the corresponding multiplicity of motor controllers. A method for gripping and flipping media cartridges is also provided in the present invention.

BRIEF DESCRIPTION OF THE DRAWINGS

The purpose and advantages of the present invention will be apparent to those skilled in the art from the following detailed description in conjunction with the drawings.

FIGS. 6–9 are perspective views of one of the cam plates shown in FIGS. 1 and 5 showing the paths followed by a guide plunger during operation of the handling apparatus;

FIG. 37 is an illustration showing sectional views of portions of the handling apparatus in FIG. 36.

DETAILED DESCRIPTION OF THE INVENTION

The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein.

Figure 1:
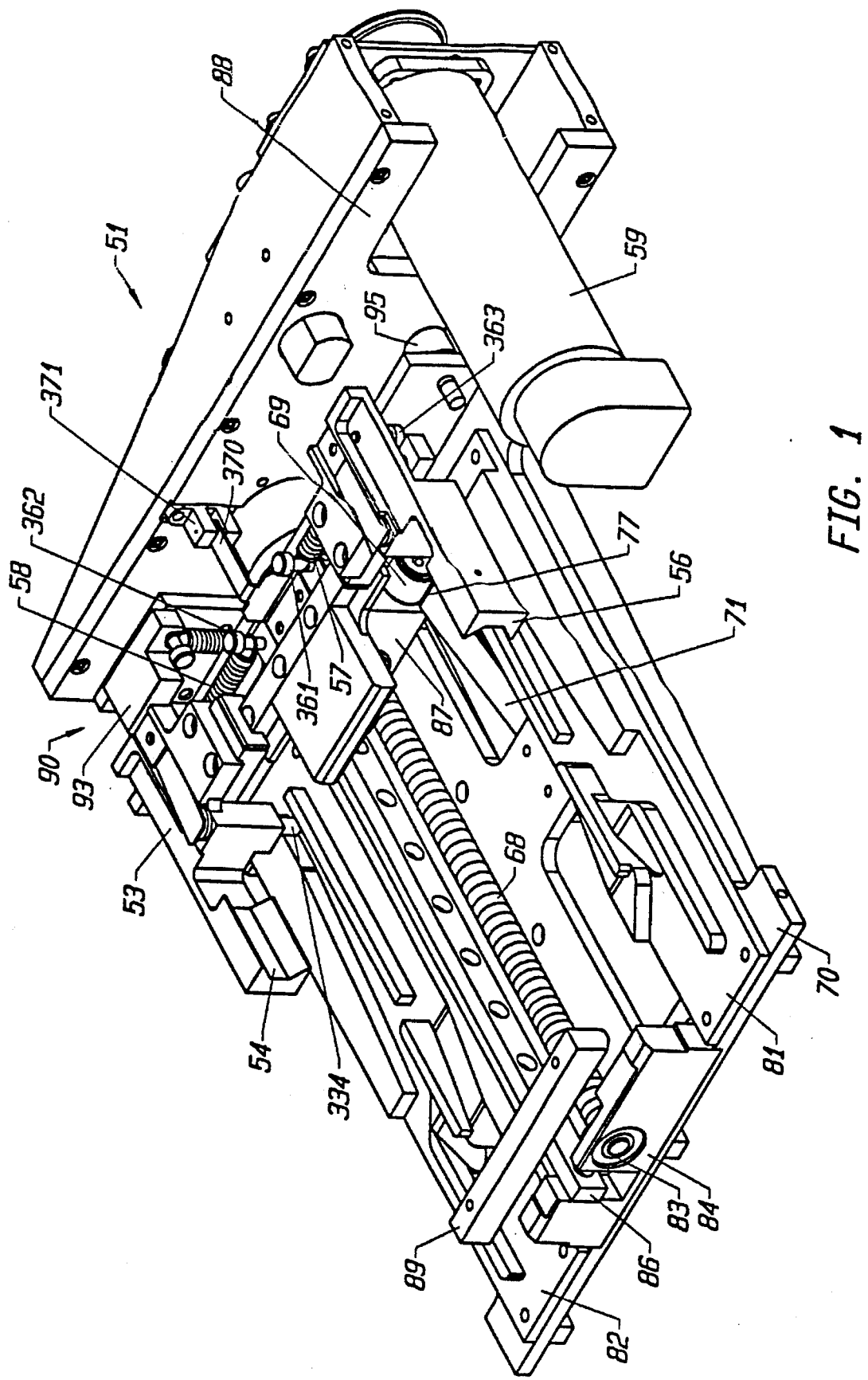
FIG. 1 is an illustration which shows a perspective view of an information media handling apparatus.
Figure 2:
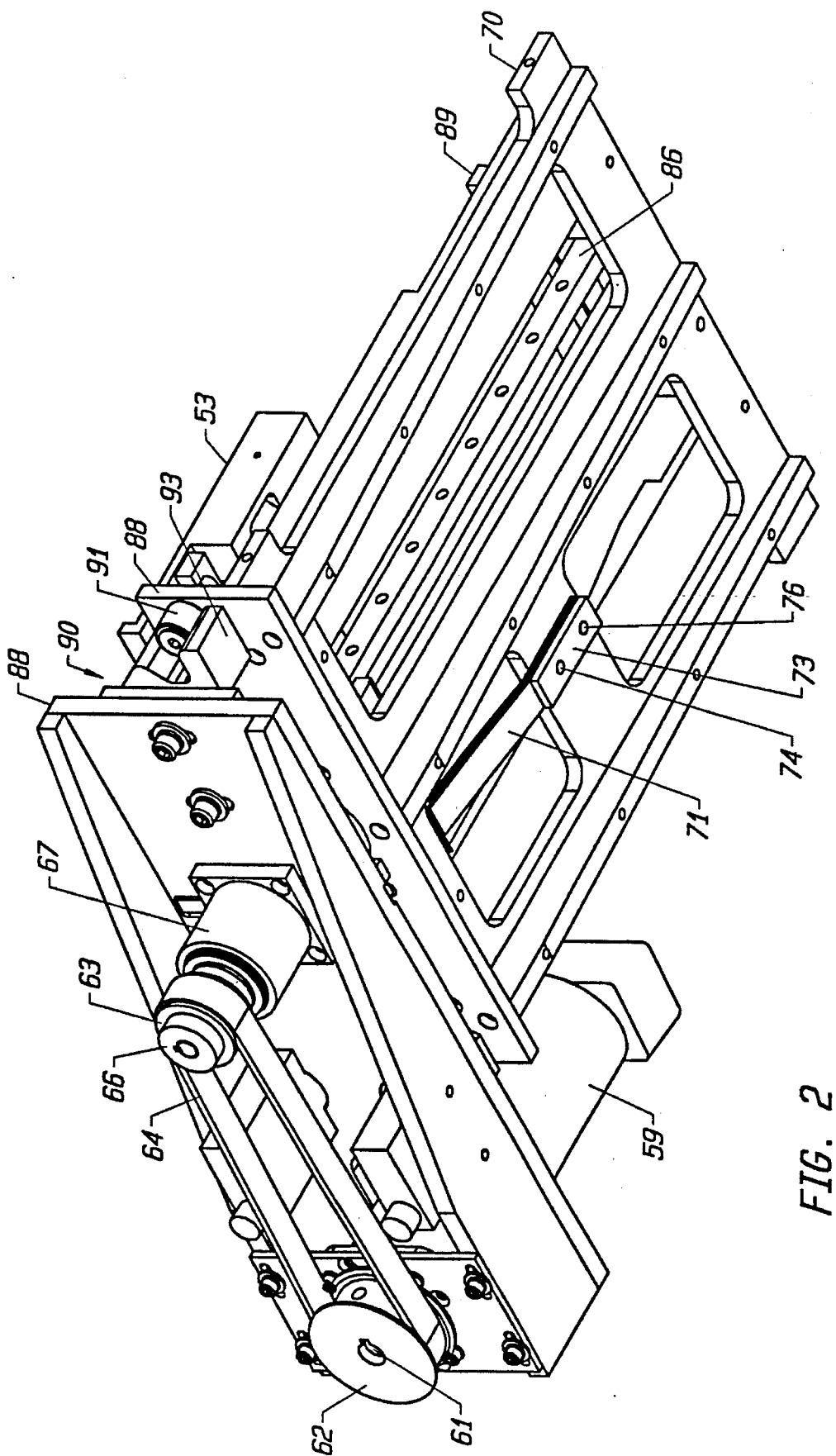
FIG. 2 is an illustration which shows a perspective view of the information media handling apparatus in FIG. 1 from a different view point.

The overall features of the media handling apparatus of the present invention are described with reference to FIGS. 1 and 2. FIG. 1 is an illustration which shows a perspective view of a handling apparatus 51 for informational media 52 (FIG. 4) such as an optical disc cartridge, magnetic tape, and the like. FIG. 2 is an illustration which shows a perspective view of the information media handling apparatus in FIG. 1 from a different view point. The handling apparatus 51 in general and the gripper mechanism 53 in particular provide the ability to grip media having a variety of physical shapes. Although many forms of media are retained in protective cartridges, typically in the form of a rectilinear box, the present invention is not limited to media contained in such cartridges. No particular surface notches or protuberances are required for operation of handling apparatus 51 or the gripper mechanism 53, although the present invention will work with media having such surface features.

The ability to grip and hold or support media having various physical shapes derives from the fact that the gripper mechanism includes a pair of jaws 54, 56 having a surface contour adapted to cradle and support the type of media being handled using a pressure force such as provided by springs 57, 58 and retain it using friction between jaws 54, 56 and the body of media 52. Other embodiments of the gripper may have jaws which have a flat surface contour and do not cradle the media, the media being held by the spring force and friction alone. Furthermore, the particular size, scale, and length to width aspect ratio, as well as other dimensions are adapted to suit the particular type of media being gripped. The structure and operation of the gripper mechanism are described in greater detail with respect to FIGS. 4a–c.

Handling apparatus 51 further comprises a motor 59 connected via a shaft 61 to pulley 62 (See FIG. 2). Pulley 62 is coupled to pulley 63 by drive belt 64. Pulley 63 is mounted to shaft 66 which is coupled via spindle apparatus 67 to threaded lead screw 68. Spindle apparatus 67 provides capability to drive, with a single motor 59, both the media flip function of the handler apparatus 51 and the lead screw 68 which then drives gripper mechanism 53 forward and backward. The structure of spindle apparatus 67 is described in greater detail with respect to FIGS. 36–37 in connection with the media flipping mechanism.

Figure 27:
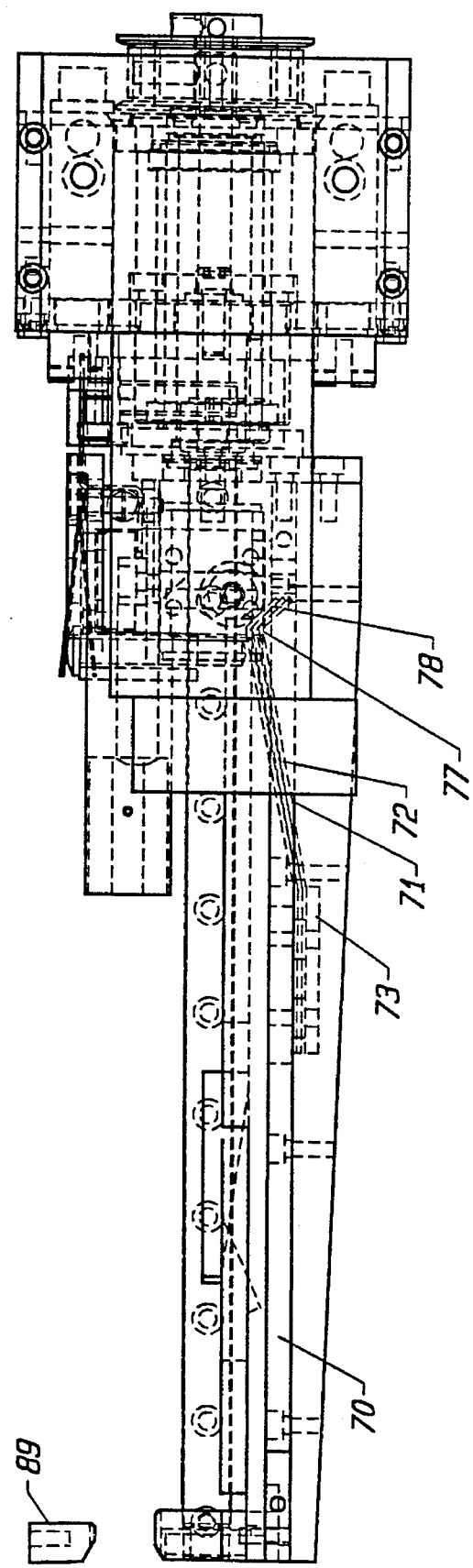
FIG. 27 is a side plan view of portions of the media handling apparatus in FIG. 1.

Also shown in FIGS. 1, 2 and 27 are the flip plate 70, cam follower bearing 69, leaf spring 71 which has a V-shape comprising a long flat region 72 attached to the lower part of flip plate 70 with plate 73 and fasteners such as rivets 74, 76. Leaf spring 71 also comprises an integral bent region 77 and a second flat region 78 (see FIGS. 5 and 27). The combination of leaf spring 71 and cam follower bearing 69 provide a detent mechanism when the gripper mechanism is driven rearward prior to a flip operation. The detent mechanism acts to resist the deceleration torque which develops when it slows down at the end of the media flip operation. Portions of the detent mechanism are also illustrated in FIG. 27.

The handling apparatus also comprises cam plates 81 and 82 attached to flip plate 70 and on either side of lead screw 68. In this embodiment, the two cam plates are mirror images of each other, however in general, and for media with nonsymmetrical shape characteristics, non-mirror image cam plates may be advantageous. Cam plates 81, 82 provide grooves or tracks that direct the lateral motions of the gripper mechanism 53 based on the location of spring loaded plungers 334 and 336 within the tracks of the cam plates as the gripper mechanism is driven longitudinally (forward and rearward) by the lead screw 68.

Lead screw 68 is rotationally mounted in a bearing 83 fixed to lead screw mounting block 84 attached to flip plate 70. Lead screw 68 is coupled to a gripper mechanism main body 87 of gripper mechanism 53 so that as the lead screw rotates in one direction gripper mechanism 53 is driven in a first direction (e.g. forward toward mounting block 84), and when lead screw 68 is driven to rotate by motor 59 in the opposite direction, the gripper mechanism is driven in the other direction (e.g., rearward toward handling apparatus back plate 88). Stop block 89, mounted on its upper surface to a housing (not shown) provides a positive stop that limits the maximum forward movement of the gripper mechanism.

Flip latch assembly 90 mounted to back plate 88 operates in conjunction with rollers 91, 95 rotationally mounted to vertical plate 92 which is fixedly mounted to flip plate 70. Flip latch assembly 90 prevents rotation of flip plate 70 (clockwise rotation as viewed in FIG. 2) and appurtenant structures (including gripper mechanism 53). Generally, when a decision is made to flip the media, the lead screw 68 is rotated to drive gripper mechanism 53 rearward with sufficient force to create a torque sufficient to release the flip latch, when the gripper mechanism reaches its maxium rearward position. This action drives roller 91 out of capture notch 98 (downward or counter-clockwise as viewed in FIG. 33) causing L-shaped member 93 to pivot about pivot 94 against a counter force exerted by spring 96. Once the media has flipped nearly 180-degrees a second roller 95 strikes region 97 of L-shaped member 93 and is slowed and ultimately stopped at the desired orientation by the controlled deceleration of D.C. servo motor 59 and the energy absorption of spring 96 and then captured by capture notch 98 which further breaks the rotation and then maintains flip plate 70 in the desired orientation. FIGS. 31–35 show various plan and perspective views of flip latch assembly 90 and operation with respect to driven roller pin 91.

Figure 3:
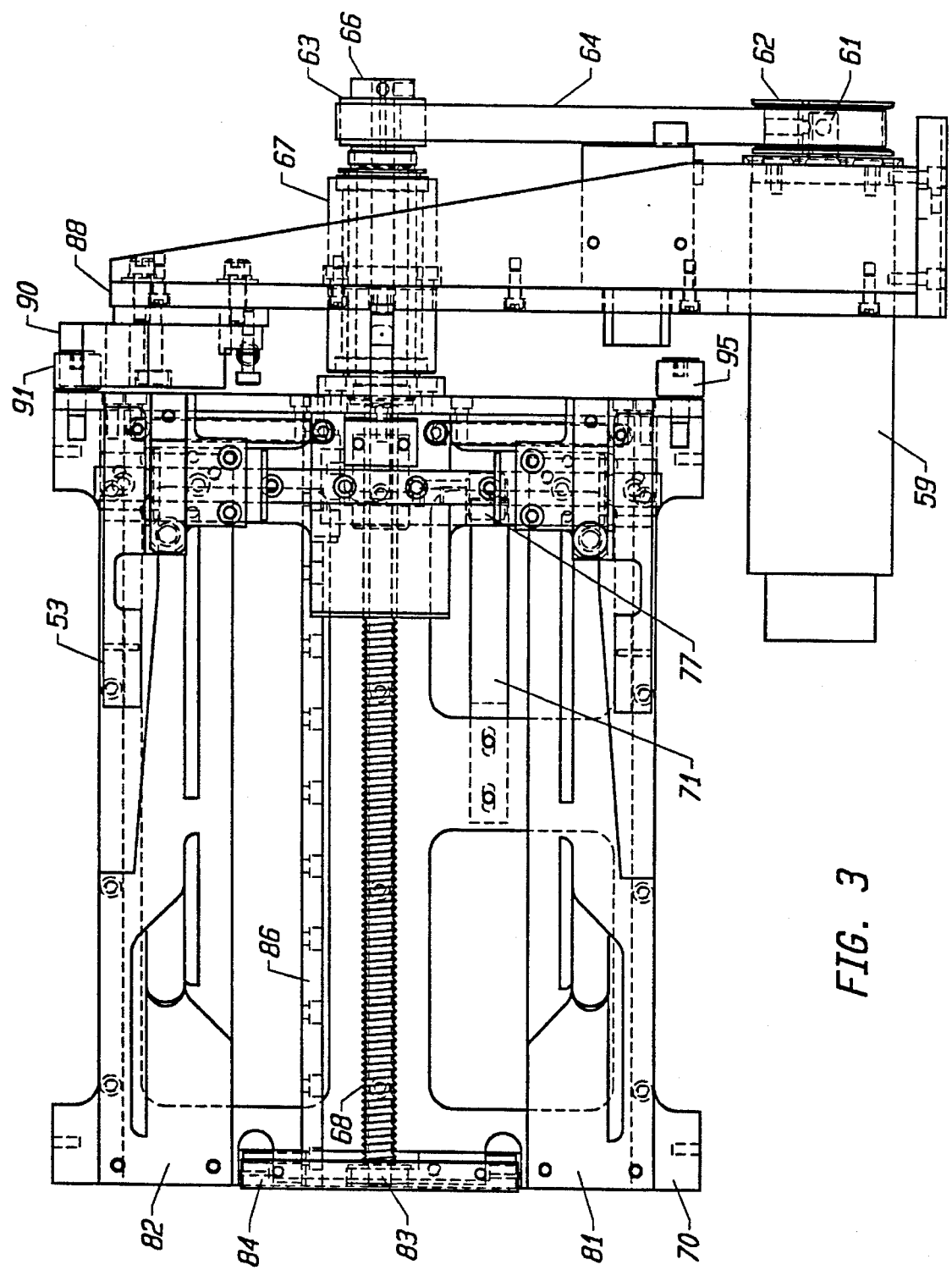
FIG. 3 is a plan view of the information media handling apparatus shown in FIGS. 1 and 2.

FIG. 3 is a plan view of the information media handling apparatus shown in FIGS. 1 and 2 and provides additional views of the structures described previously.

Figure 4A:
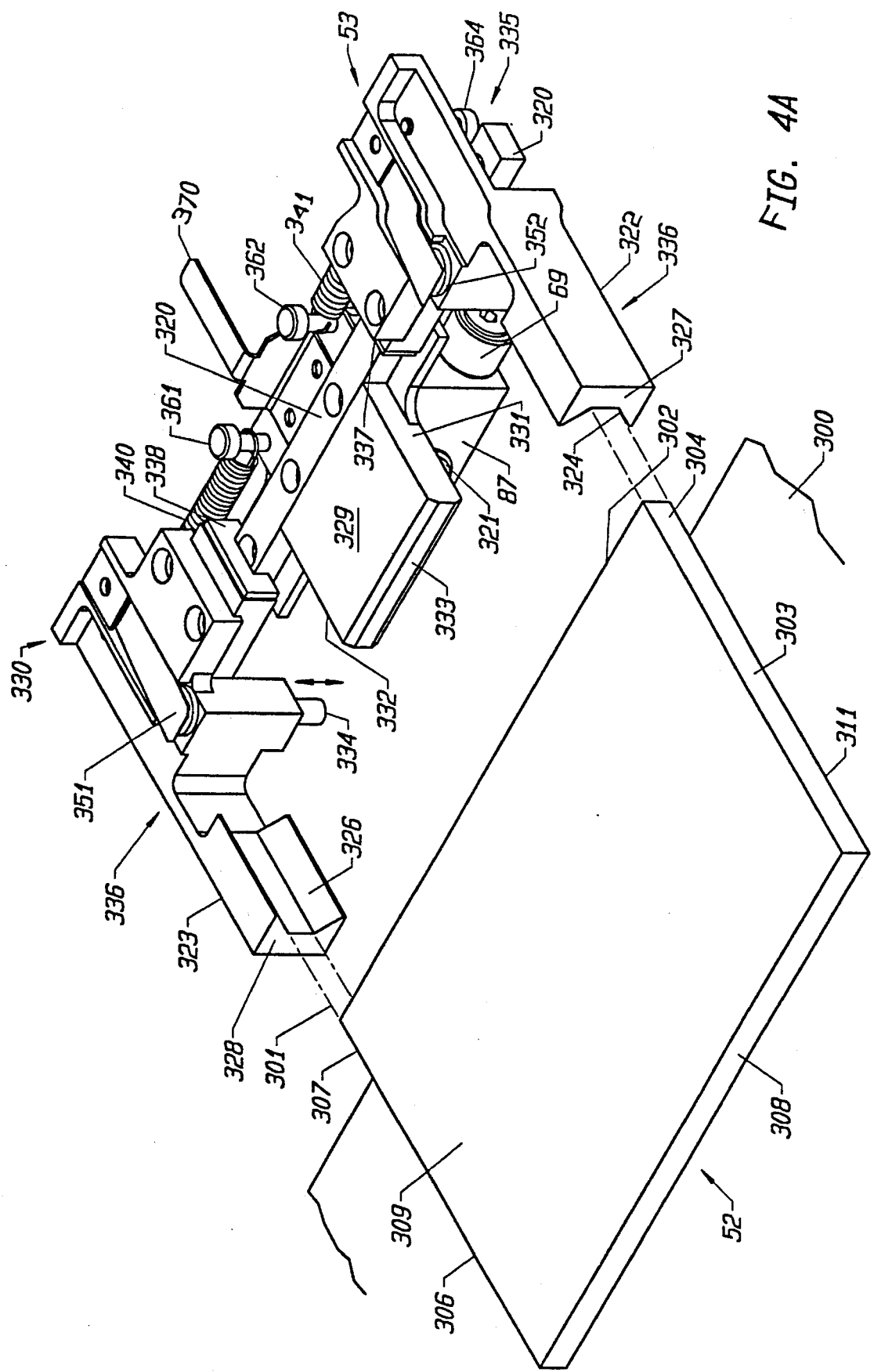
FIG. 4a–4c are perspective views of a portion of the handling apparatus shown in FIG. 1 showing an embodiment of a gripper mechanism and its relationship with a media cartridge.
Figure 4B:
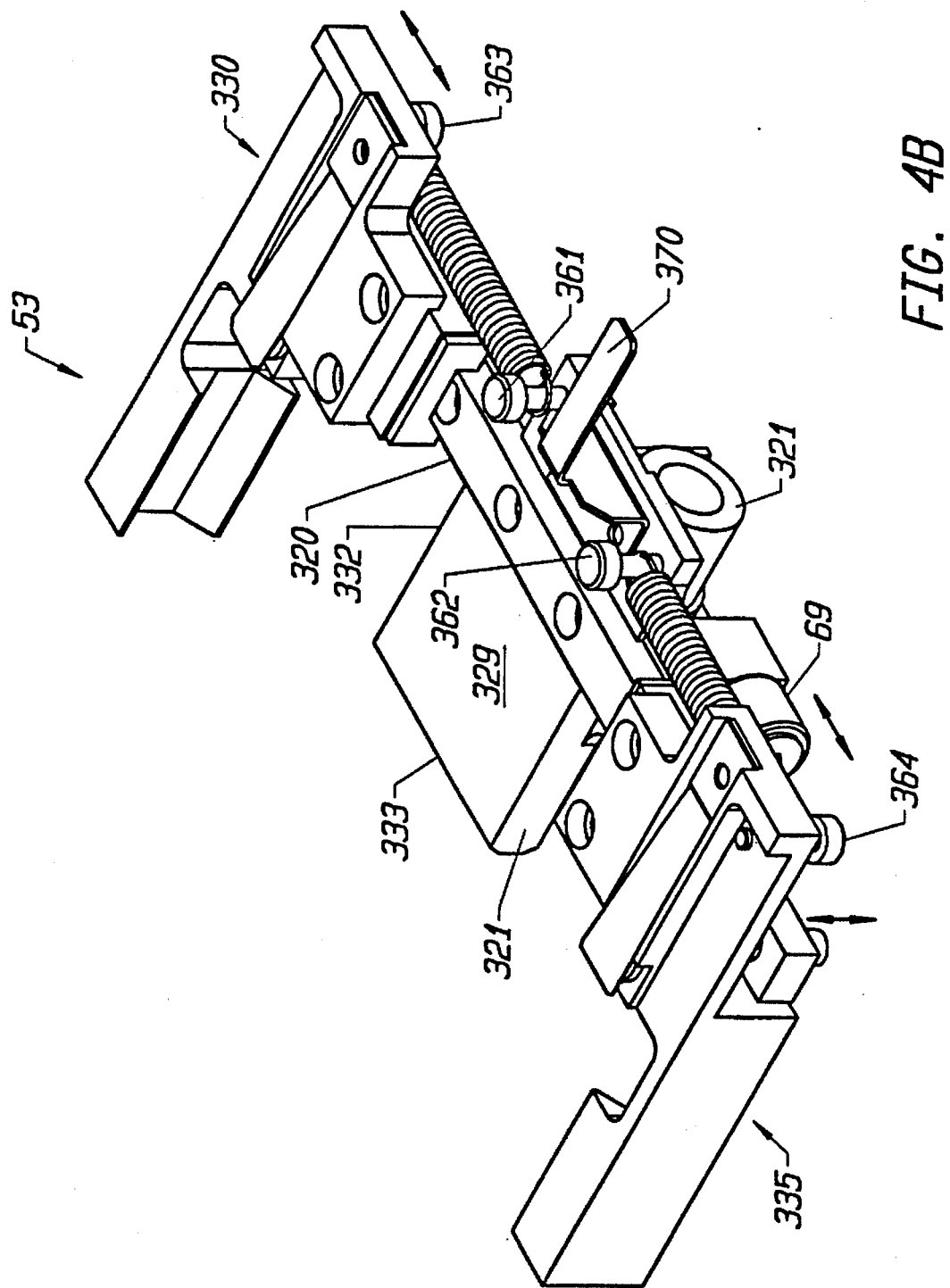
Figure 4C:
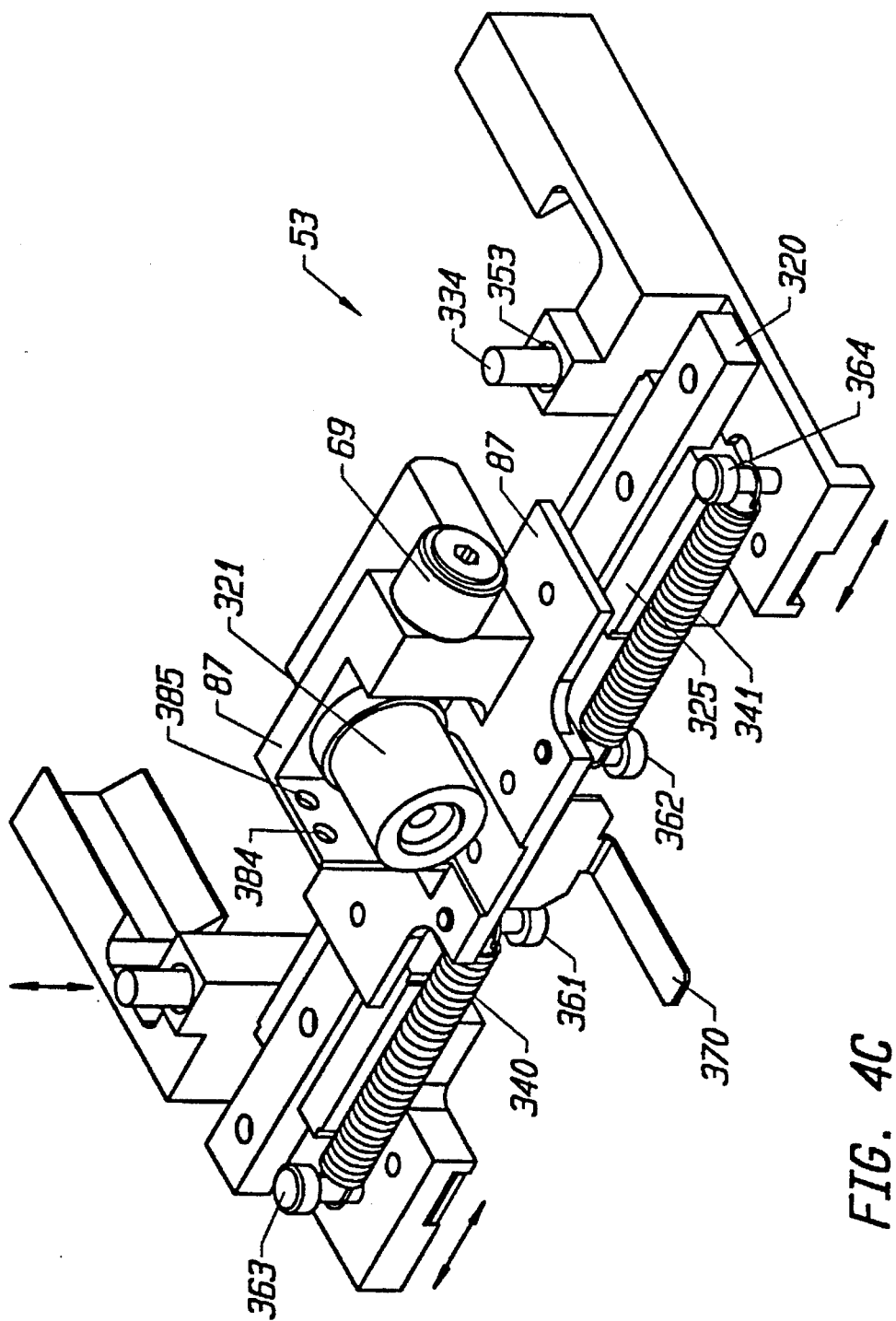
Figure 5:
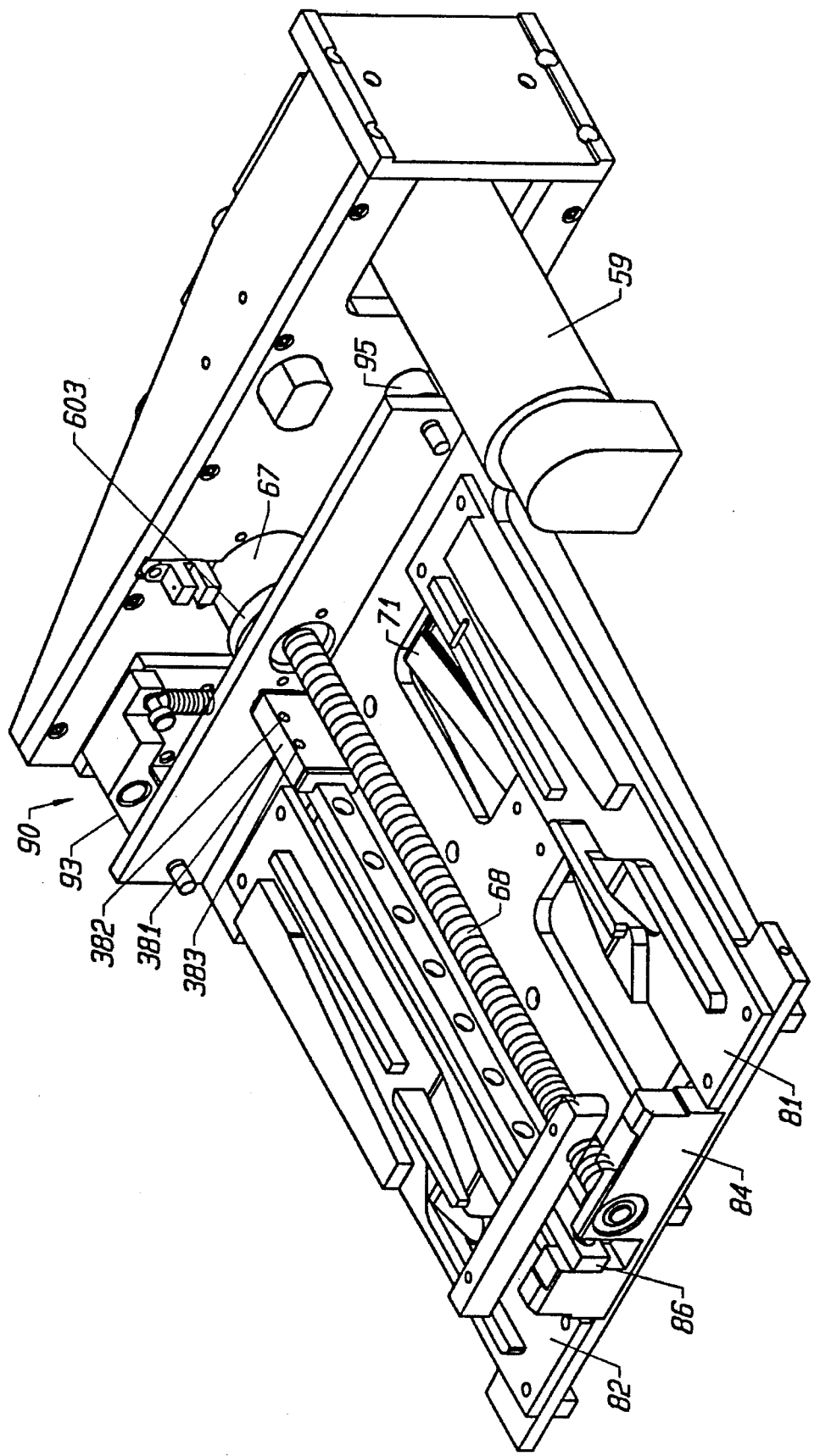
FIG. 5 is a perspective view of the media handling apparatus in FIG. 1 with some components removed to show the structure of cam plates that direct the lateral motions of the gripper mechanism as the gripper mechanism is driven longitudinally.

FIGS. 4 and 5 provide separate views of gripper mechanism 53 (FIGS. 4a, 4b, 4c) and handling apparatus 51 with gripper mechanism 53 removed from the illustration to show the underlying structures (FIG. 5). FIGS. 4a, 4b, and 4c are perspective views from different view points of gripper mechanism 53, shown within the assembly drawing in FIG. 1. FIG. 4a shows an embodiment of a gripper mechanism 53 from one view point and its relationship with a media cartridge 52, and shelf or other location 300, which the gripper mechanism may move toward to grasp and grip the media cartridge. FIG. 4b shows the same gripper mechanism embodiment as in FIG. 4a but from a second view point and particularly illustrates structures of gripper mechanism 53 that are disposed adjacent back plate 88 in FIG. 1. FIG. 4c is an illustration that shows the same structures as would be seen from a view point opposite to FIG. 4a. Like reference numerals indicate like structures in the illustrations and this description is made relative to all of FIGS. 4a–4c.

Gripper mechanism 53 comprises gripper mechanism main body 87 to which a linear rail 320, and internally threaded nut 321 are fixedly attached. A home position indicator 370 is attached to main body 87 which intercepts a sensor beam (e.g. light emitting diode and sensor pair) in receptor 371 when the gripper mechanism is in its home position at the rear of the flip plate as shown in FIG. 1. Main body 87 has a hole aligned with the attached nut 321 so that lead screw 68 can pass through nut 321 and main body 87. Cam follower bearing 69 is mounted at a fixed location so that when installed within the handling apparatus 51, it rolls along spring 71, or sits within the detent as previously described. Bumper 329 is also fixedly attached to or an integral part of main body 87 so as to present three surfaces 331, 332, and 333 as stops and/or energy absorbing structures.

Internally threaded nut 321 has a thread that is complementary to the thread of lead screw 68. Lead screw 68 is threaded through nut 321 so that when the lead screw is turned in one direction, nut 321 and structures attached to it are driven longitudinally in one direction (i.e forward) along the lead screw. When the lead screw is turned in the opposite direction, nut 321 is driven in the opposite direction (i.e. rearward). Nut 321 is fixedly attached to main body 87 so that it does not rotate when the lead screw rotates so that the rotational motion of the lead screw is transformed into a linear motion of nut 321 so that the entire gripper mechanism is translated forward and rearward to retrieve and or insert media into a selected location.

Rail 320 is fixedly attached to main body 87 transverse to the direction of travel imparted by lead screw 68. In the exemplary embodiment, the rail is a rectangular bar, however it will be clear that various types of rails or other sliding surfaces may be used to provide the relative movement between the rail and other components as described below.

Gripper mechanism 53 also comprises first and second cam follower and jaw assemblies 330, 335. In the embodiment shown each assembly is a mirror image of the other about the longitudinal axis aligned with the lead screw. Therefore it is necessary to describe only one of the assemblies 330, 335. Cam follower and jaw assembly comprises a linear bearing 325 that slidably mates with rail 320 and an elongated gripper arm 336 fixedly attached to linear bearing 325 and extending in a generally orthogonal direction to the direction of linear bearing travel as indicated by bidirectional arrows adjacent the linear bearings in FIGS. 4b–4c.

Each gripper arm 336 has a jaw 323 region that is adapted to cradle and hold a portion of the media cartridge. The jaw region 323 may contain optional pins or other protuberances or depressions to mate to specific surface features on a particular media cartridge; however, such pins or other protuberances or depressions are not required for operation of the invention.

A spring loaded plunger 334 extends from a hole 353 in each gripper arm toward the cam plate 81 fixedly attached to the flip plate 70. When the gripper mechanism is installed in the handling apparatus, plunger 334 extends to travel within the cam plate tracks or channels as shown in FIG. 1. In particular, as the lead screw is driven by motor 59 under control of a control system such as a computer, microprocessor, or other controller, the plunger is driven forward or rearward and in so traveling is directed along a path transverse to the lead screw travel direction. Since each plunger 334 is coupled to a gripper jaw 323, the pair of jaws are moved closer or further apart from each other to grip or release a media cartridge.

The afore recited spring loading of plunger 334 is provided by flat springs 351, 352 which urge the plungers to maintain contact with the cam plate surface. Spring loading is required because the cam plates 81, 82 have three-dimensional surface conformations, including ramps and steps that control or limit the plunger travel path and direction. Spring loading is also required because the gripper mechanism including proper interaction between the plungers and cam surface, must continue to work properly when the media has been picked up in one orientation and then flipped 180 degrees to present the other surface of the media to a single side media drive. The operation of the gripper mechanism with respect to the three-dimensional cam profile is described hereinafter with respect to FIGS. 6–9 and FIGS. 10–26.

The cam plates and their associated plungers 334 provide a means for directing transverse movement of the gripper jaws 323 as a function of the longitudinal position and direction of the gripper mechanism. Furthermore, different paths are followed by the plunger along the cam plate depending on whether a media cartridge is interposed between the jaws or not. When a cartridge is being held, inward movement of the jaws toward the center is restricted by the presence of the cartridge.

Proper tracking of plunger 334 within tracks of cam plate 81 is achieved by applying a biasing force to each cam follower and jaw assembly 330, 335. In the illustrated embodiment of FIGS. 4a–4c, the biasing force is provided by springs 340, 341 connected between fixed shoulder screws 361, and 362 on main body 87, and shoulder screws 363, 364 on each cam follower and jaw assembly 330, 335. These springs pull the assemblies toward each other and assist in maintaining contact between each plunger 334 and walls defining the tracks within cam plates 81, 82.

With respect to bumper 329 attached to the main body, bumper surface 333 is used as a contacting and pushing surface when retrieving a media cartridge from a storage location or media drive device and when inserting a media cartridge in a storage location or media drive device. For example, front bumper surface 333 will contact and push media cartridge 302 when moving the cartridge into the desired location. Note that it may be necessary in some applications to push the media cartridge a greater distance into a drive device such as a player or recorder, then to push it into a storage location within a storage rack or storage magazine. Similarly bumper surfaces 331, 332 act to limit the inward transverse movement of cam follower and jaw assemblies 330, 335 when in the fully inward biased positions.

Bumper 329 may be any suitable material such as metal, and may optionally be covered with a resilient or elastomeric material such as rubber on the surfaces to cushion the impact of these surfaces with an abutting structure, or bumper 329 may be made of a resilient material when advantageous.

FIG. 5 is a perspective view of the media handling apparatus in FIG. 1 with the gripper mechanism 53 removed to show the structure of cam plates 81 and 82, rail 86, and linear bearing 381 which slidably mates to rail 86. Linear bearing 381 is fixedly attached to gripper mechanism main body 87 by screws (not shown) through holes 384, 385 in main body 87 (see FIG. 4c) into threaded holes 382, 383 in linear bearing 381. The function of cam plates 81, 82 that direct the lateral motions of the gripper mechanism as the gripper mechanism is driven longitudinally are described with respect to FIGS. 6–9 and FIGS. 10–25 hereinafter.

FIGS. 6–9 are perspective views of one of the cam plates shown in FIGS. 1 and 5 showing the paths followed by a guide plunger during operation of the handling apparatus. FIGS. 10–26 are schematic illustrations showing the relationship between a media cartridge, a media holding location, and components of the gripper mechanism at various stages during the operation of the handling apparatus. The operation of the gripper mechanism are now described with respect to these figures.

There are four main phases involved in retrieving media from one location and inserting it in another (or the same) location including: (1) initialization at start up (See FIG. 6) which includes moving the gripping mechanism from retracted position to a first location proximate the media to be retrieved; (2) retrieve (get) media from first location (See FIG. 7); (3) partially insert media into second location and release gripping means (See FIG. 8); and (4) complete insertion (push) into second location and retract gripping mechanism (See FIG. 9). Once the gripper mechanism has been initialized, only steps 2–4 are needed to complete a cycle of retrieving a media cartridge and inserting the cartridge into a different (or the same) location. When it is further desired to flip the media cartridge, the gripper mechanism is driven to the initialization position and then flipped. The retrieve and insert cycle may performed.

FIG. 4 is an illustration of an embodiment of a gripper mechanism and an exemplar of a media cartridge, such as an optical disc, a ¾-inch tape cassette, a ½ inch tape, 19-mm VHS tape, an 8-mm tape, a super-VHS video tape, a DAT audio tape, an audio or video compact disc, a digital CD-ROM, analog audio tapes in the Phillips cassette format, magnetic discs or diskettes, floppy discs, Bernouli-type disc cartridges, or any other like media.

Figure 10:
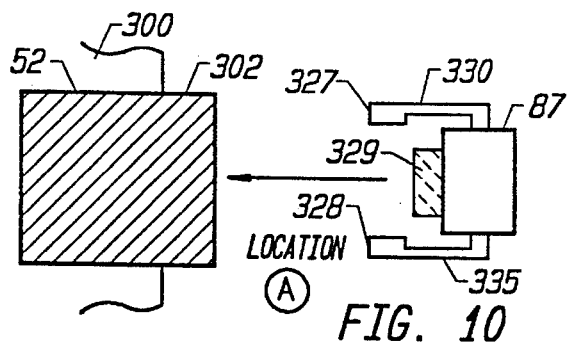
FIGS. 10–26 are schematic illustrations showing the relationship between a media cartridge, a media holding location, and components of the gripper mechanism at various stages during the operation of the handling apparatus.

This description describes the movement of the gripper mechanism beginning with the gripper mechanism at the rear of the media carrier and in the rear portion of the cam directing means in position "A" as shown in FIG. 10. As can be seen from the structure of the gripper mechanism in FIG. 4 and the partial assembly drawing including the cammed surfaces and walls of cam plates 81, 82 in FIG. 5, the structure has right and left lateral mirror symmetry, and the operation on one side mirrors operation on the other side. Therefore, the description of the structure and operation of one side is sufficient to characterize the operation of the other side as well.

The gripper mechanism will be in position "A" when the media is in the storage position in the storage rack or shelf 300. Each arm of the gripper mechanism 53 is biased toward the centerline of the gripper by spring 340, 341 or other means for biasing. However, the movement inward is limited by side surfaces 331, 332 of bumper 329.

Figure 11:
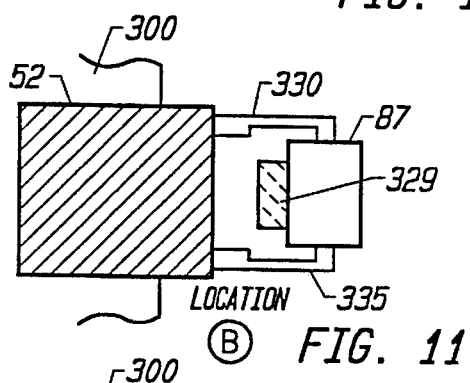
Figure 15:
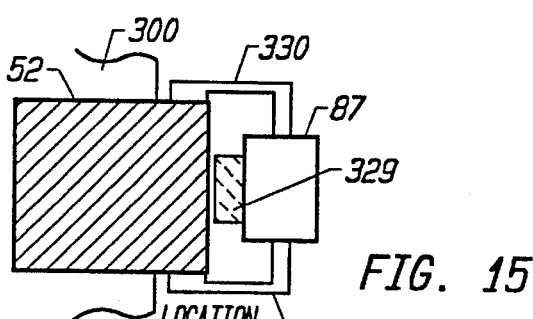
Figure 12:
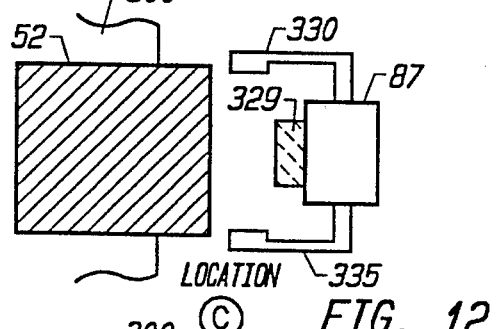

The plunger 334 extending from each arm of the gripper mechanism will be in the inner most channel because of the biasing spring and the absence of a media cartridge between the two jaws. As the gripper is driven forward plunger 334 follows inner channel 501 of the directing cam including the upward sloping ramp portion 502 and then falls down over step 503. When plunger 334 has reached location B the jaws of gripper mechanism 53 abut front media surface 302 as illustrated in FIG. 11. The motor is then reversed so that the plunger follows a path between locations 504 and 506 and then up the ramp to location 507 and down the step to location 508. The reversal of the motor causes two effects. First, the gripper mechanism moves back away from the media. Second, the jaws spread apart as a result of the beveled cam between locations 506 and 507.

Figure 13:
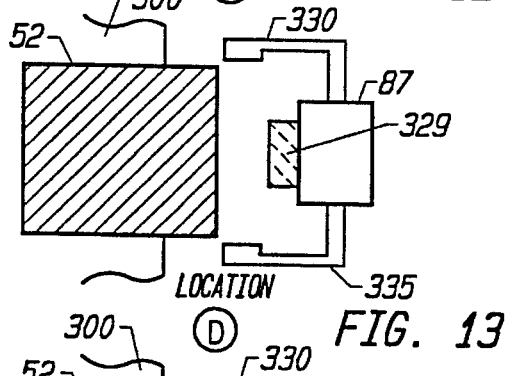

When the plunger reaches location 508, the motor is reversed again so that the gripper mechanism is driven forward. Plunger 334 follows the cam director from locations 508 to 509 causing the jaws to separate further as shown for position "C" in FIG. 12, so that they are open at least as wide as the width of the media between media surfaces 304 and 307 when the plunger reaches position "D" as illustrated in FIG. 13. As the gripper mechanism is driven further forward, the jaws surround media surfaces 304, 307 but do not grip the surfaces as shown for position "E" in FIG. 14. As the gripper mechanism is driven further forward past the end of the cam at location 512, the jaws under the force of the biasing springs are quickly pulled toward the center so that the jaws clamp onto media surfaces 304 and 307 and securely grip it. The spring force of springs may be selected to achieve the desired amount of holding force.

The U-shaped or filled V-shaped notches in jaws 324, 326 allow media items having somewhat different thicknesses to be acquired within the throat of the jaws and gripped by the jaws to support the media without problem. For example, media of the same type made by different manufacturers or at different times may have some dimensional variation. The jaw notches coupled with the spring bias force also provide some media centering ability. The spring biasing provides additional tolerances with respect to retrieving the media from a storage or drive location and in placing media into a storage or drive location.

Figure 16:
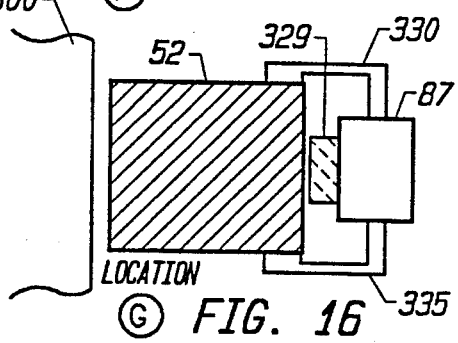

Once the media has been gripped, the gripper mechanism is driven to the rear along the path from locations 514 to 516, then plungers 334,336 of the gripper mechanism travels up the ramp between locations 516 and 517, down the step to location 518 and then to location 519. Because media 52 is gripped between the jaws, the bias force provided by the springs, though still present and providing the gripping force, is not able to move the plunger to the inner channel as it did before when no media was gripped. The overall effect of movement from location 514 to location 519 is to pull-out or retract the media from its then current location as shown in FIG. 16. For example, this movement would be used to pull the media from its storage location or alternatively from the media player or player/recorder.

Figure 17:
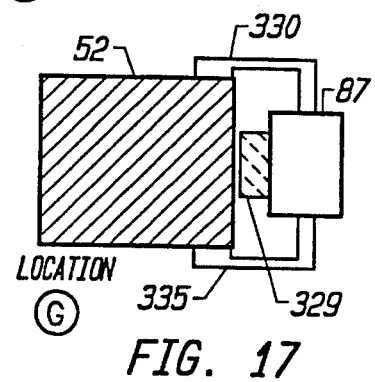
Figure 14:
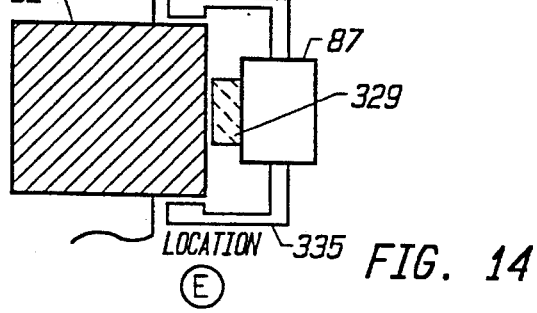
Figure 18:
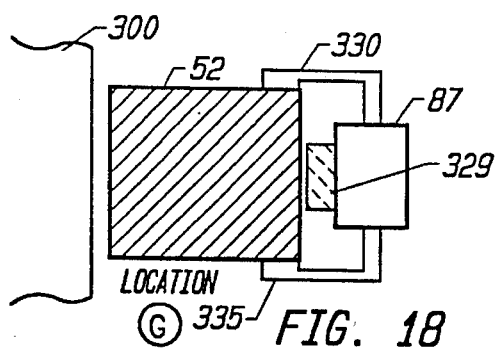
Figure 19:
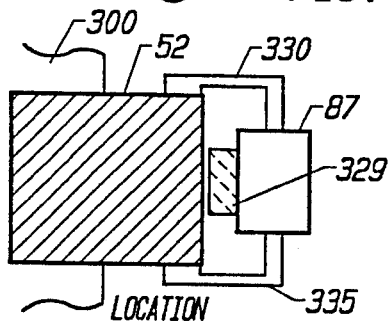
Figure 23:
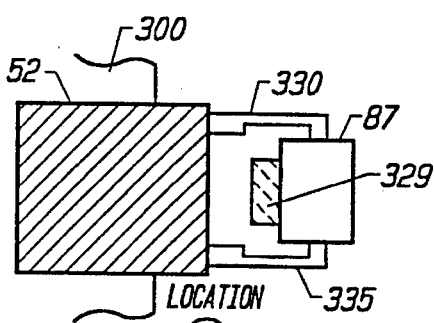
Figure 20:
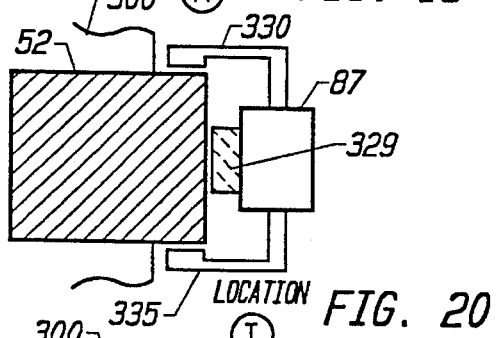
Figure 24:
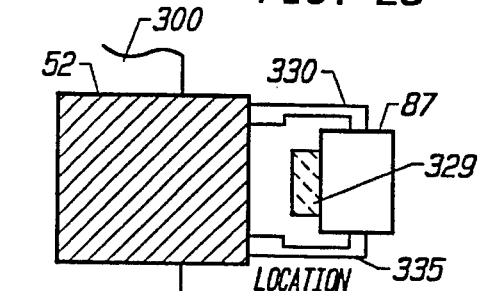

Once the media has been retracted it may be handled independent of physical restrictions caused by the storage shelf or media drive unit as shown in FIG. 17. For example, the media may be moved from location to location, flipped over to allow insertion in the same or a different location to access the other side, or the like.

To insert the media in a media drive (or into a different storage location) the gripper mechanism is moved to the selected destination adjacent to the desired media drive using conventional methods and apparatus. Then the gripper mechanism is driven forward toward the selected destination. As the gripper mechanism is driven forward, plunger 334 partially retraces the path between locations 521 and 522 (the same path but in the opposite direction as between locations 518 and 519, previously described). However, when the plunger reaches location 522 the step 526 prevents the plunger from continuing in a straight line and plunger 334 follows the cam profile toward and then around and past location 523. When the plunger reaches location 522, the media is still gripped but also partially inserted and supported by the destination location (e.g. either the storage shelf or the media driver 300) as shown for location "H" in FIG. 19. Because it is supported, the gripping force can be removed without the media falling from the destination location. The gripping force is removed and the jaws are retracted by continuing to drive the gripper mechanism 53 forward so that the plunger passively follows the cam from location 522 to location 524. The gripping force is removed when the plunger reaches location 523, and the additional jaw separation provides clearance as the media continues to be moved toward its destination by contact with the front surface 333 of bumper 329 as shown for location "I" in FIG. 20. Relaxation of the frictional gripping force provides sufficient clearance and free-play that the media does not bind as it is moved forward. Because the jaws extend beyond the plane of the destination location (i.e. the media driver) the media cannot be fully inserted without altering the location of the jaws relative to the media as described hereinafter.

Figure 21:
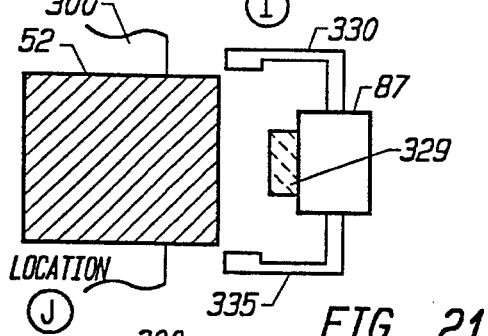
Figure 25:
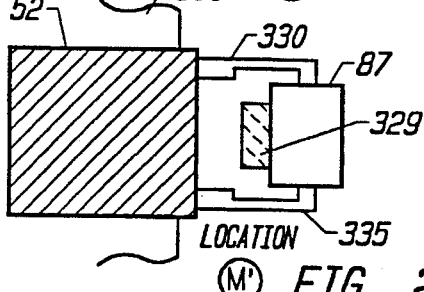
Figure 22:
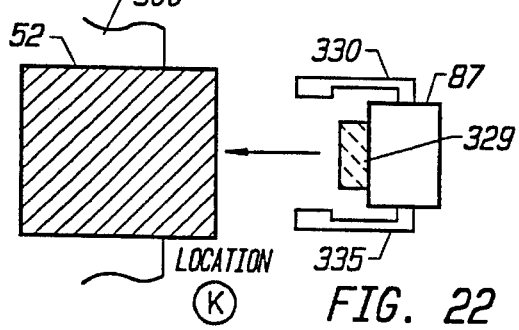
Figure 26:
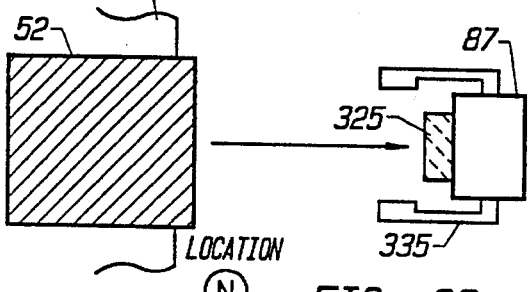

The gripper mechanism is driven rearward so that plunger 334 moves from location 524 to location 527 at which time jaws clear front media surface 302 as shown for location "J" in FIG. 21. As the gripper mechanism continues to be driven rearward, plunger 334 follows the cam profile from location 527 to 528 and then to 529. Because the jaws are no longer held apart by the presence of the media, the spring bias force urges the plunger through the opening or gate 530 in the cam wall so that the plunger returns to the inner-most pathway at location 531 and follows the path to locations 532 and 533. It may not generally be necessary to move all the way back to location 533, it is sufficient that the gripper mechanism be driven back sufficiently so that the jaws clear the media allowing the plunger to return to the inner-most path. At location 532 the relative relationship between the media 52, the destination location at shelf or media driver 300 and the gripper mechanism is as shown for location "K" in FIG. 22.

The front ends 327, 328 of the gripper jaws are then used to complete insertion of the media into the destination location by driving the gripper mechanism forward. The gripper mechanism is driven forward so that plunger 334 moves from location 532 up ramp 534 to location 536. At this point, the front surfaces of the jaws contact media front surface 302 as shown for location "L" in FIG. 23. Further driving of the gripper mechanism causes plunger 334 to fall off the cam step to location 538.

Depending on the distance required to push the media into the destination location, the gripper mechanism may be driven further forward as required. Typically, media must be pushed further to insert it into a player or other drive unit (e.g. location M') than into a storage location (location M). Once the media is properly located in the destination location as shown for location "M" in FIG. 24, the gripper mechanism is driven rearward along the cam wall from location 538, up the ramp to location 541, and down the step to location 542 (the same as location 528 in FIG. 9 and location 508 in FIG. 6). Once the plunger reaches location 542, which is the equivalent location to location 508 in FIG. 6, the gripper mechanism drive means may be reversed so as to drive the mechanism forward to immediately move toward and grip other media. However, when the handling apparatus is initialized or when the handling apparatus is going to execute a media flip operation, the gripper mechanism may preferably be driven rearward until the plunger passes through gate 530, returns to the inner-most path, and reaches location 533 where the process began and as illustrated for location "N" in FIG. 25. Home position indicator 370 intercepts the sensor beam in receptor 371 at this initialization or home position as earlier described. The media flip operation is initiated by rotating lead screw 68 to drive the gripper apparatus further rearward to the maximum rearward position where there can be no relative translational movement between gripper mechanism 53 and vertical plate 92 so that as the lead screw continues to be rotated the torque created causes the entire flip plate 70 and appurtenant structures (including gripper mechanism 53) to rotate.

Figure 28:
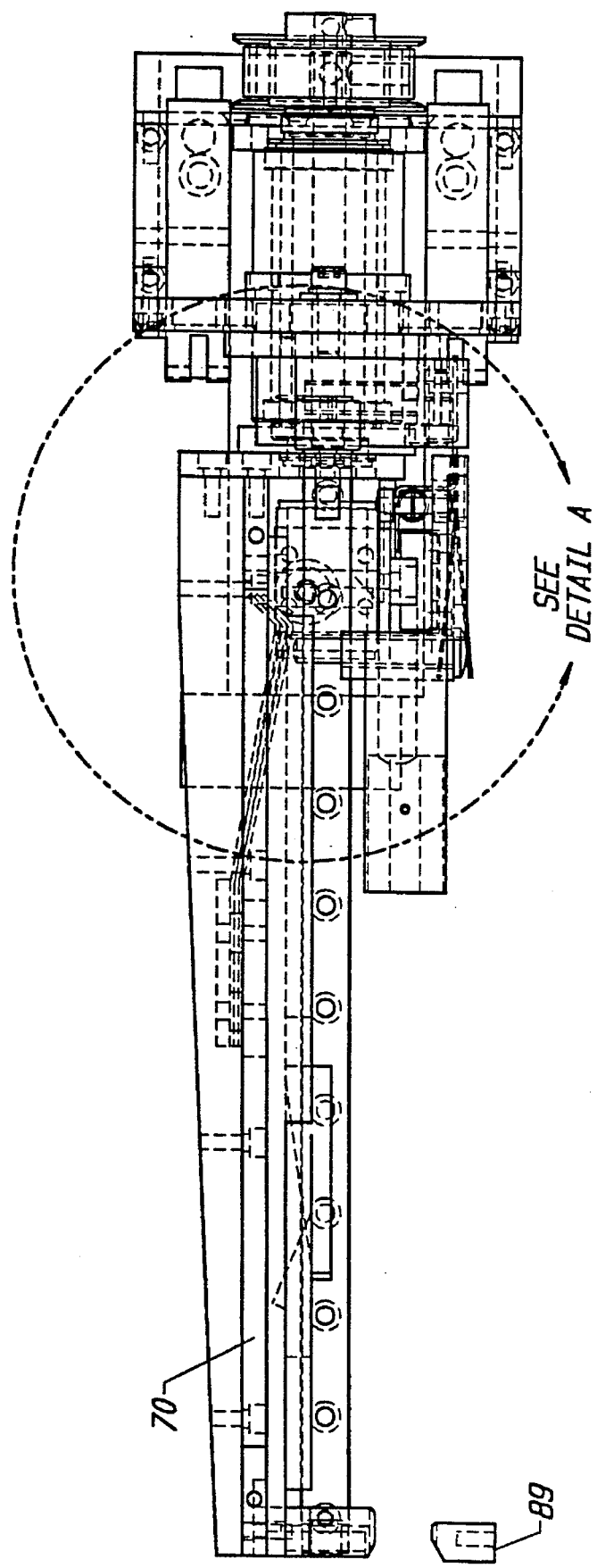
FIG. 28 is a different side plan view of portions of the media handling apparatus in FIG. 1.
Figure 29:
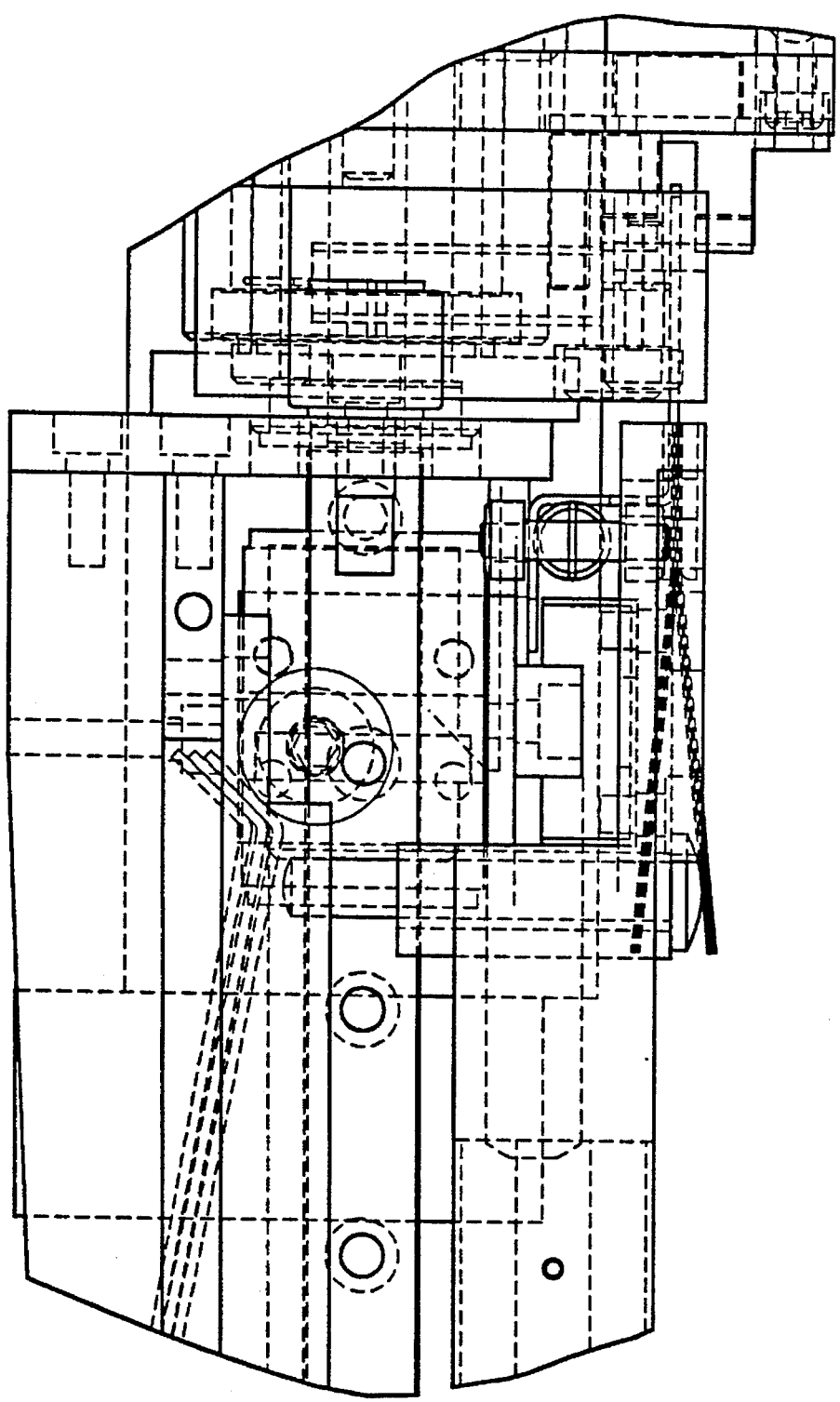
FIG. 29 is a detail view of a portion of the media handling apparatus in FIG. 27.
Figure 30:
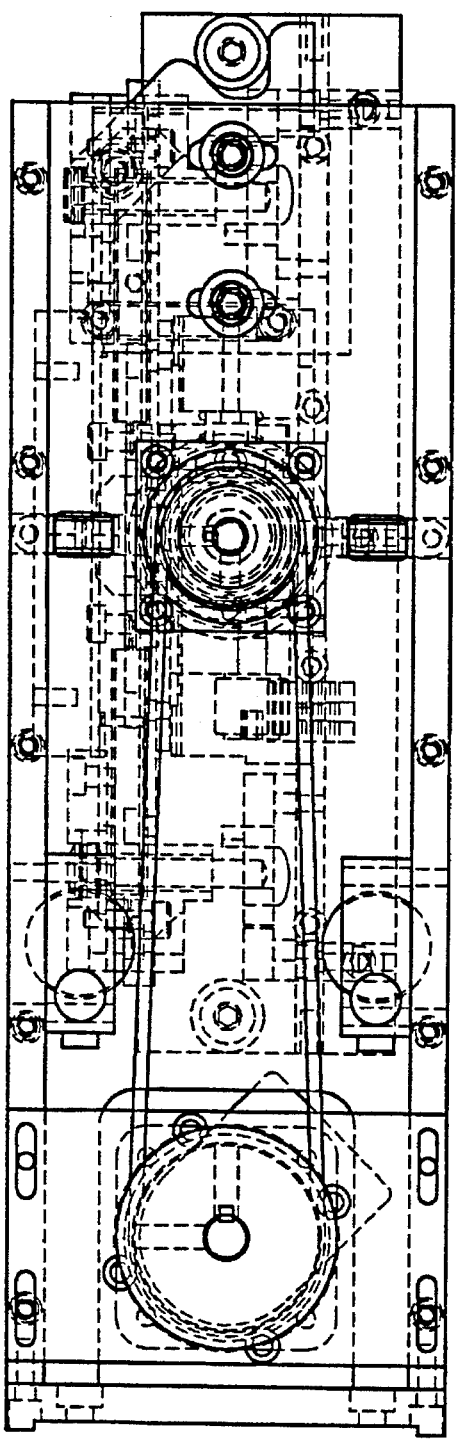
FIG. 30 is an end plan view of a portion of the media handling apparatus in FIG. 1.
Figure 34:
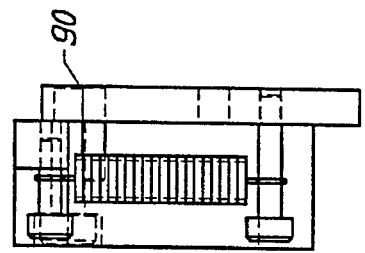
FIGS. 31–35 are detailed views of the apparatus shown in the perspective view of FIG. 1.
Figure 35:
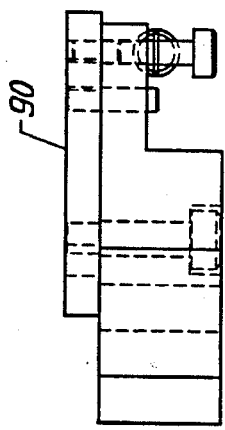
Figure 33:
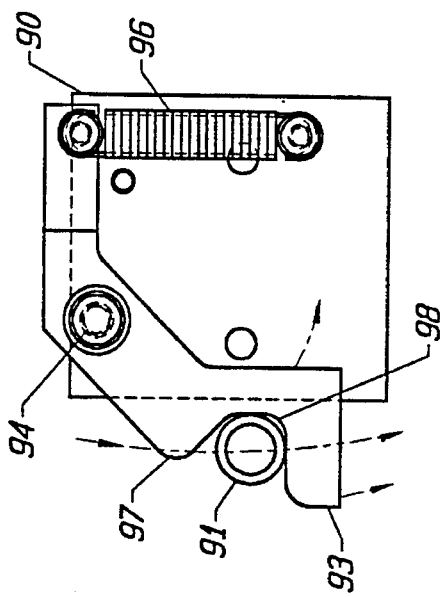
Figure 32:
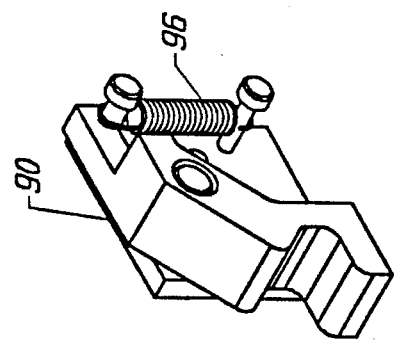
Figure 31:
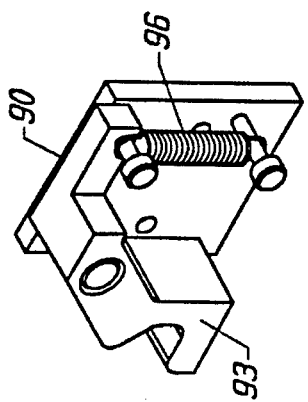

FIG. 27 is a side plan view of portions of the media handling apparatus in FIG. 1. FIG. 28 is a different side plan view of portions of the media handling apparatus in FIG. 1. FIG. 29 is a detail view of a portion of the media handling apparatus in FIG. 27. FIG. 30 is an end plan view of a portion of the media handling apparatus in FIG. 1. These figures show additional structural detail of one embodiment of the invention.

FIGS. 31–35 are detailed views of the flip latch assembly 90 and operation with respect to driven roller pin 91 as described herein before.

Figure 36:
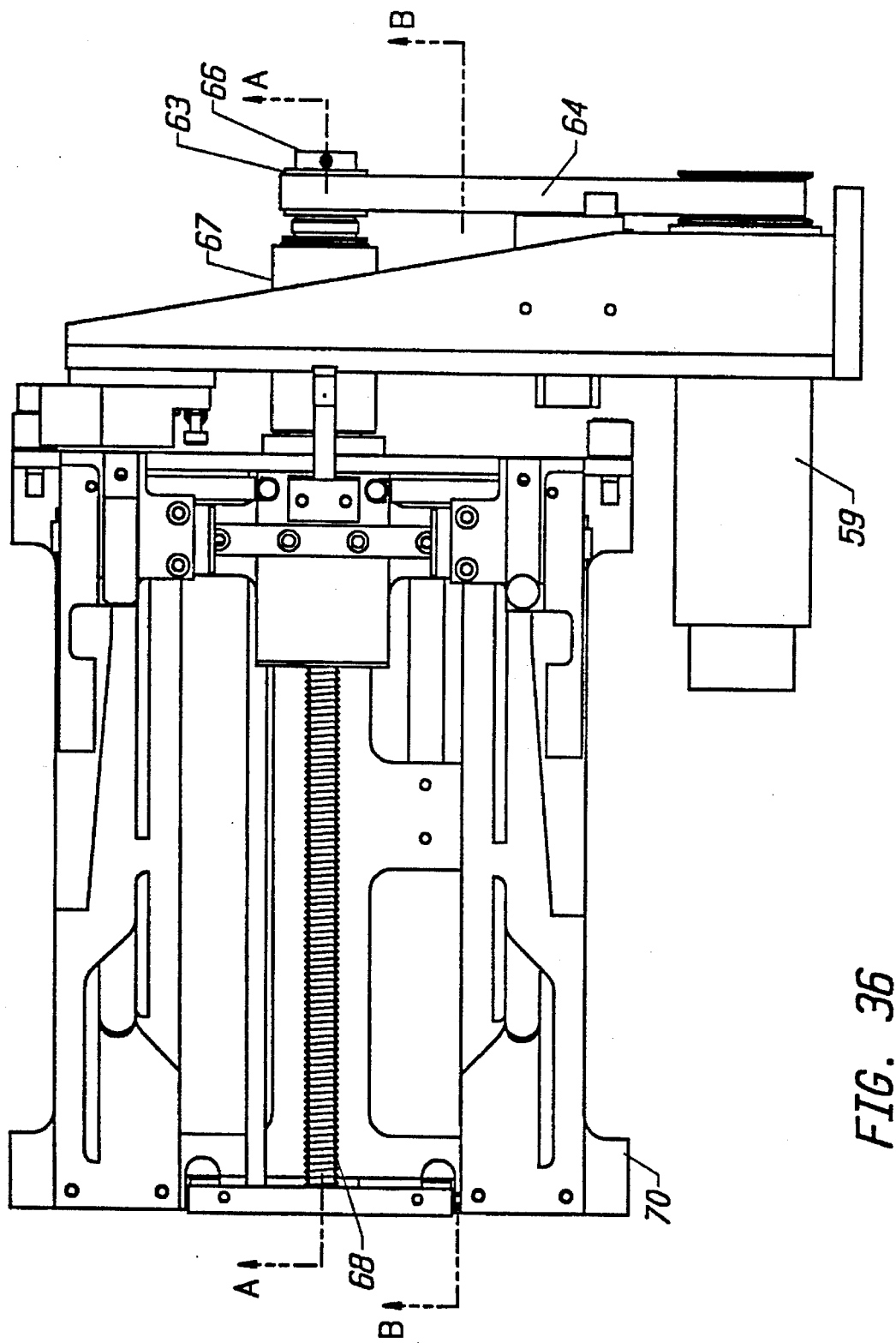
FIG. 36 is an illustration showing a plan view of the handling apparatus in FIG. 1.

FIG. 36 is an illustration showing a plan view of the handling apparatus in FIG. 1 and also illustrating the locations of Sections A—A and B—B. FIG. 37 is an illustration showing sectional views A—A and B—B of portions of the handling apparatus in FIG. 36. FIG. 36 particularly illustrates the structure of one embodiment of a spindle-within-a-spindle design incorporated in the present invention that permits a single motor 59 to drive both the lead screw 68 to move the gripper mechanism, and to provide torque to spin the flipper plate (with attached gripper mechanism gripping a media cartridge).

Lead screw support bearings 601 are provided for supporting the lead screw at each end and between the ends. Lead screw support bearings 601 are mounted within the flip spindle housing 605 and lie along a concentric axis. Flip spindle support bearings 602 are mounted in spindle housing 605 and provide support for the flip spindle 603. Flip spindle 603 is attached to plate 88 so that rotation of flip spindle 603 causes the desired rotation of the flip plate. Flip spindle housing 605 is also provided. These structures enable the media flip operation to be accomplished with the same motor and about the same axis as the gripper mechanism movement as described previously.

The flip latch assembly 90 assists in stopping and maintains the flip plate rotational position at the end of the flip cycle. The media flip operation is under control of a motor 59, a D.C. servo motor, operating under a controlled velocity profile. The stucture provides for coaxial location of the lead screw and the flipper axis thereby eliminating additional components such as shafts, gears, and the like present in other implementations. The flip latch assembly 90 maintains the position of the flip plate during periods of time when rotation of the flip plate is not desired. Likewise the cam follower bearing 69 in the detent position of flat spring 71 provides sufficient holding force to retain the gripper mechanism 53 in its rearward most position during a flip operation; the torque needed to move the gripper mechanism from the detent being greater than the torque needed to spin the flip plate. The flip operation is initiated by driving the gripper apparatus to the maximum rearward position where there can be no relative movement between the components so that the flip is initiated when the motor is driven further. Once the flip is initiated, the velocity of the DC motor is contolled including a decelleration. Ultimately the flipped orientation is maintained after the flip cycle has stopped at the end of the flip operation by flip latch 90. The flip latch maintains the orientation of the flip plate during normal operation of the gripper mechanism; torques which may develop being insufficient to release latch 90 unless the gripper mechanism is driven to the maximum rearward position.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims and their equivalents.

All publications and patent applications cited in this specification are herein incorporated by reference as if each individual publication or patent application were specifically and individually indicated to be incorporated by reference.

What is claimed is:

1. An informational media item handling apparatus for frictionally engaging an informational media item including a media item having no surface notches or protrusions to latch to, said apparatus comprising:

two opposed gripping arms for frictionally gripping portions of said media item to engage and support said item in predetermined gripping regions on two different surfaces of said media item and for releasing said frictional gripping to release said media item;

gripping force means for urging said two opposed gripping arms in predetermined first opposed directions to provide a gripping force for engaging and supporting said media item;

means for longitudinally moving said two gripping arms in a longitudinal direction toward a media item holding location and for moving said two gripping arms away from said media item holding location;

means for passively transversely moving each of said two opposed gripping arms in said first opposed directions transverse to said longitudinal direction to engage and support said media item and for passively transversely moving each of said two opposed gripping arms in second opposed directions transverse to said longitudinal direction and opposite to said first opposed directions to disengage said media item, said means for passively transversely moving being coupled to said means for longitudinally moving; and control means for directing said means for passively transversely moving in response to a combination of longitudinal movements performed by said means for longitudinally moving and in response to the presence or absence of said media item gripped by said two opposed gripping arms.

2. The apparatus of claim 1, wherein said informational media item comprises a substantially rectangular informational media cartridge, and wherein said two opposed gripping arms are disposed to grip opposing sides of said cartridge between said arms.

3. An informational media item handling apparatus said apparatus comprising:

gripping means for frictionally gripping portions of said media item to engage said item and for releasing said frictional gripping to release said media item;

means for longitudinally moving said gripping means in a longitudinal direction toward a media item holding location and for moving said gripping means away from said location;

means for passively transverse moving said gripping means in a direction transverse to said longitudinal direction, said means for passively moving being coupled to said means for longitudinally moving; and control means for directing said means for passively transverse moving in response to a combination of longitudinal movements performed by said means for longitudinally moving and in response to the presence or absence of said media item between said gripping means;

said control means including:
a three-dimensional cam structure; and
plunger means mounted to said means for gripping for following one of a plurality of travel tracks within said cam structure.

4. The apparatus in claim 3, wherein said means for longitudinally moving comprises:

a motor; and a lead screw having a lead-screw axis of rotation coupled to said motor; and further comprising means for flipping said media item about an axis coaxial with said lead screw axis.

5. The method of claim 2, wherein said informational media item comprises an informational media cartridge.

6. In a media handling apparatus, a device for frictionally engaging a parallelepiped shaped media item including a parallelepiped shaped media item having no surface notches or protrusions to latch to, said device comprising:

gripping means for frictionally gripping portions of said media item to engage and support said item and for releasing said frictional gripping to release said item;

means for longitudinally moving said gripping means in a longitudinal direction toward a media item holding location and for moving said gripping means away from said location;

means for passively transversely moving said gripping means in a direction transverse to said longitudinal direction; and control means for directing said means for passively transverse moving in response to a combination of longitudinal movements by said means for longitudinally moving and the presence or absence of said media item engaged with said gripping means;

said means for passively moving being coupled to said means for longitudinally moving.

7. The apparatus in claim 6, wherein said control means comprises:

a three-dimensional cam structure; and plunger means mounted to said means for gripping for following one of a plurality of travel tracks within said cam structure.

8. The apparatus in claim 7, wherein said three-dimensional cam structure comprises:

a plurality of channels each said channel having walls to guide and restrain said plunger means in said longitudinal and transverse direction, and openings in said walls to permit passage of said plunger means between said channels;

said three dimensional cam structure further comprising ramps for urging said plunger means over selected ones of said walls while traversing particular ones of said channels in one direction, said walls preventing said plunger means from traversing said ramps in a direction opposite to said one direction.

9. The apparatus in claim 8, wherein said plunger means includes: a plunger mounted for one-dimensional deflection against said three-dimensional cam structure; and plunger force means coupled to said plunger for continually urging said plunger into abutting contact with said three-dimensional cam structure.

10. A media handling apparatus for picking and flipping an informational media item including a parallelepiped shaped media item having no surface notches or protrusions to latch to, said apparatus comprising:

means for cradling and frictionally gripping and supporting said media item including said parallelepiped shaped media item having no surface notches or protrusions;

means for transporting said media item from a first location into a recessed region of said media handling apparatus;

said means for cradling and frictionally supporting being operable to cradle and support said media item even when said media item is positioned outside of said recessed region;

means for transporting said media item from said recessed region into a second location; and means for flipping said media item retained within said recessed region of said apparatus.

11. A method for manipulating an informational media item including a media item having no surface notches or protrusions to latch to, said method comprising the steps of:

retrieving said media item from a first media item receptacle at a first location, including frictionally gripping said media item with a pair of frictional gripping surfaces and withdrawing said media item longitudinally rearward;

partially inserting said media item into a second media item receptacle at a second location by advancing said media item longitudinally forward, wherein said second media item receptacle may be the same or a different media item receptacle from said first receptacle;

releasing said frictional grip from said media item;

withdrawing said gripping means longitudinally rearward from and out of contact with said media item;

advancing said gripping means longitudinally forward toward and into abutting contact with said media item; and pushing said media item an additional predetermined distance longitudinally forward into said second media item receptacle at said second location without gripping said media item to completely insert said media item into said second media item receptacle at said second location.

12. The method in claim 11, further comprising the step of returning said pair of frictional gripping surfaces to a home location.

13. The method of claim 12, further comprising the step of flipping said media item after said step of retrieving and before said step of partially inserting.

14. The method of claim 12, further comprising the step of moving said retrieved media item from a first location and inserting said media item into a different second location.

15. The method in claim 14, wherein said first location is a media item storage location and said second location is a media item player device.

16. The method in claim 14, wherein said first location is a media item drive device and said second location is a media item storage location.

17. In an informational media handling system for handling an informational media item including a media item having no surface notches or protrusions to latch onto, said system including a handling apparatus having a nonrotating frame and a rotatable media item gripper assembly coupled to said frame, and having only one active motional means coupled to a leadscrew mounted coaxially to a spindle shaft having a spindle shaft axis of rotation about which said gripper assembly is rotatable;

a method for controlling manipulation of said media item including retrieving said media item from a media item location and inserting said media item into the same or a different location and optionally flipping said media item 180 degrees about said spindle shaft to present alternative sides of said media item to a media player/recorder at one of said locations, said method comprising the steps of:

applying a holding force to hold said gripper assembly from rotating about said spindle shaft when a torque smaller than a predetermined threshold torque is applied about said spindle shaft axis;

driving said motional means to cause said leadscrew to rotate in a first direction to move said gripping assembly longitudinally forward toward said media item location;

driving said motional means to cause said leadscrew to rotate in a second direction opposite to said first direction to move said gripping assembly longitudinally rearward away from said media item location;

driving said motional means to rotate said leadscrew further in said second direction to move said gripping assembly to a position where relative movement between said gripper assembly and a frame member is prevented so that sufficient torque greater than said threshold torque is created by said further rotation to overcome said holding force and to initiate a rotation of said gripper assembly about said spindle shaft from a first rotational orientation;

applying a counter force to stop said gripper assembly rotation at a predetermined rotational orientation about 180 degrees from said first rotational orientation; and applying a holding force to maintain said rotational orientation while permitting moving said gripper assembly longitudinally;

whereby said media item longitudinal forward movement, said media item rearward movement, and said media item rotation are all generated by said one active motional means.

18. The method in claim 17, further comprising the step of applying a latching force to prevent said longitudinal forward movement and longitudinal rearward movement of said gripper assembly during said gripper assembly rotation.

19. The method in claim 18, wherein said active motional means is a servo motor and wherein said servo motor is driven to rotationally accelerate said gripper assembly when initiating said rotation and driven to decelerate and stop said gripper assembly when said rotation is nearly complete in a controlled velocity profile.

20. The method in claim 19, further comprising the step of:

flipping said media item 180 degrees about an axis parallel to said longitudinal movement direction after said step of moving said gripper assembly longitudinally rearward to said retracted position.

21. The method in claim 20, further comprising the step of relocating said gripper assembly to a destination location with said media item attached after said step of flipping said media item.

22. In a media handling system for handling an informational media item including a media item having no surface notches or protrusions to latch onto, said system including a handling apparatus having a nonrotating frame and a rotatable gripper assembly coupled to said frame, said gripper assembly including a pair of opposed gripping surfaces, and having only one active motional means coupled to a leadscrew mounted coaxially to a spindle shaft; a method for controlling manipulation of said media item including retrieving a media item from a media item location and inserting a media item into the same or a different location and optionally flipping said media item 180 degrees to present alternative sides of said media item to a media player/recorder at one of said locations, said method comprising the steps of:

initializing said gripper assembly without a media item, including the step of moving said pair of opposed gripping surfaces away from each other so that said opposed gripper surfaces are separated by a distance greater than the width dimension of a media item to be manipulated; and exchanging said media item from one location to the same or to a different location;

said step of exchanging media item comprising the steps of:

locating said gripper assembly adjacent to a media item at a media item source location;

moving said assembly longitudinally forward to a grip position, said gripper surfaces extending longitudinally forward toward said media item and separated by a distance greater than said media item width dimension;

gripping a media item with said gripping surfaces of said gripper assembly at said grip position by moving said opposed gripping surfaces toward each other in a direction transverse to said longitudinal movement of said assembly so that said surfaces engage and grip side surfaces of said media item, said gripping force provided by said bias force that urges said opposed surfaces to move toward each other;

supporting said media item against the force of gravity with said opposed gripping surfaces;

moving said gripper assembly longitudinally rearward to a retracted position with said media item gripped and supported by said gripper assembly so that said media item is physically clear of said source location;

moving said gripper assembly longitudinally forward to a media item release position with said gripped media item to partially insert said media item into said destination location, said media item being sufficiently inserted into said destination location so that said media item is supported against the force of gravity by said destination location when said grip is subsequently released;

releasing said grip on said media item by moving said gripping surfaces apart from one another against said bias force to remove said grip and said support so that said media item is deposited and supported at said destination location;

moving said gripper assembly longitudinally rearward without said media item to a transition position a sufficient distance from said deposited media item so that a subsequent movement of said gripping surfaces toward each other causing a separation of a distance less than the width dimension of said media item will not result in contact with said media item;

moving said gripper surfaces toward each other so that forward ends of said gripper surfaces are at least partially longitudinally aligned with a front surface of said media item to configure said gripper assembly for subsequent pushing of said media item into said destination location;

moving said gripper surfaces longitudinally forward a distance sufficient to place said gripper jaw forward ends into abutting contact with said media item front surface and to push said media item completely into said destination location; and moving said gripper assembly longitudinally rearward to a ready position that is clear of said inserted media item and of said destination location so that said gripper assembly may be subsequently directed either to manipulate said media item at said same destination location or alternatively to move to a different location to manipulate a different media item.

23. The method of claim 22, wherein said informational media item comprises an informational media cartridge.

24. The method in claim 22, wherein said gripper surfaces include gripper jaw portions for cradling and centering said media item.

25. The method as in claim 22, wherein said step of moving said gripper assembly in a forward longitudinal direction comprises the step of electrically driving said servo motor to rotate said servo motor in a first direction for a predetermined number of rotations; and said step of moving said gripper surfaces in a rearward longitudinal direction comprises the step of electrically driving said servo motor to rotate said servo motor in a direction opposite to said first direction for a predetermined number of rotations;

said servo motor being coupled to a threaded leadscrew so that rotation of said servo motor causes rotation of said leadscrew;

said leadscrew being coupled to a matingly threaded member fixed to said gripper;

said gripper surfaces being selectably and controllably inhibited from rotation about said longitudinal axis during said longitudinal movement step;

whereby when said servo motor rotates in said first direction said gripper assembly is caused to translate forward and when said servo motor rotates in opposite direction said gripper assembly is caused to translate rearward parallel to the axis of rotation of said leadscrew.

26. The method in claim 25, wherein said step of moving said opposed gripping surfaces toward each other to grip said media item comprises the step of:

generating a transverse position for said cross member corresponding to each longitudinal position in response to longitudinal movement of said apparatus; said generated transverse position determined by a combination of factors including by said longitudinal position, by whether said longitudinal motional direction of said gripping assembly prior to reaching said longitudinal position is a forward or rearward motional direction, and by whether a media item is present or absent from between said gripping surfaces of said gripping assembly.

27. The method in claim 26, wherein said step of generating a transverse position for said cross member further comprises the steps of:

providing a plurality of interconnected guide paths;

providing a path follower plunger;

biasing said path follower plunger in first and second axis with a bias forces;

coupling said path follower plunger to said plurality of interconnected guide paths; and selectively following one of said guide paths in response to said combination of factors.

28. The method in claim 27, wherein said step of selectively following one of said guide paths comprises the steps of:

providing at least one path follower probe, said probe being positionally fixed relative to one of said opposed gripper surfaces, said gripper surfaces being movable toward or away from each other in a direction transverse to said longitudinal direction;

providing a plurality of gates along walls of said guide path;

applying a transverse biasing force to urge said probe in a transverse direction against said cam walls, and said opposed gripper surfaces coupled to said probe toward or away from each other;

applying a second biasing force to urge said probe against a surface of said guide path in a direction orthogonal to a plane defined by said longitudinal axis and said transverse axis; and exerting a longitudinal force to move said probe from a starting position along a guide path in said longitudinal direction so that said probe passively follows and is restrained in movement by transverse and vertical cam contours of said guide path to direct said probe from a starting position by said longitudinal position;

said vertical cam contours acting as unidirectional gates so that alternative paths are passively selected and traversed in response to whether said longitudinal motional direction of said gripping assembly through said cammed region is in a forward or rearward motional direction;

said transverse cam contours directing said probe and said gripper surfaces coupled to said probe in said transverse direction and thereby moving said gripper surfaces toward each other or away from each other depending on said cam contour profile;

said transverse motion of said probe and of said gripper surfaces being limited to a predetermined distance when a media item is present between said gripper surfaces of said gripping assembly.

29. An apparatus for handling an informational media item including a media item having no surface notches or protrusions to latch to, said apparatus comprising:

a gripper assembly for gripping said media item;

a spindle shaft having a spindle shaft axis of rotation about which said gripper assembly is controllably rotatably mounted;

a leadscrew mounted coaxially with said spindle shaft;

a first holding latch to hold said gripper assembly from rotating about said spindle shaft when a torque smaller than a predetermined threshold force is applied about said spindle shaft axis;

a motor coupled to said leadscrew to cause said leadscrew to rotate in first and second directions to move said gripping assembly longitudinally forward toward a media location and rearward away from the same or a different media location;

a motor drive control for applying a controlled velocity profile drive to said motor;

gripper assembly translation stop means for stopping the rearward movement of said gripping assembly at a position where relative movement between said gripper assembly and a frame member is prevented so that sufficient torque is created to overcome said threshold holding force and to initiate a rotation of said gripper assembly; and counter force means for applying a counter force to stop said gripper assembly rotation at a predetermined rotational orientation; and a second holding latch for applying a holding force to maintain said rotational orientation while permitting moving said gripper assembly longitudinally;

whereby said media item longitudinal forward movement, said media item rearward movement, and said media item rotation are all generated by said one motor.

30. An informational media item handling apparatus for frictionally engaging an informational media item including a media item having no surface notches or protrusions to latch to, said apparatus comprising:

gripping means for frictionally gripping portions of said media item to engage and support said item and for releasing said frictional gripping to release said item;

means for longitudinally moving said gripping means in a longitudinal direction toward a media item holding location and for moving said gripping means away from said location, said means for longitudinally moving includes a motor, and a lead-screw having a lead-screw axis of rotation coupled to said motor;

means for passively transversely moving said gripping means in a direction transverse to said longitudinal direction, said means for passively moving being coupled to said means for longitudinally moving;

control means for directing said means for passively transversely moving in response to a combination of longitudinal movements performed by said means for longitudinally moving and in response to the presence or absence of said media item gripped by said gripping means;

means for flipping said media item about a flip axis coaxial with said lead-screw axis; and spindle means coupled to said motor for driving both said means for flipping said media item and said lead-screw to drive said gripper means longitudinally.

31. The apparatus in claim 30, wherein said spindle means comprises:

a first hollow shaft mounted for rotation to a non-rotatable frame;

a second shaft rotatably mounted coaxially to and extending through said first shaft and coupled to a motor;

means for maintaining said first shaft stationary but allowing said second shaft to rotate within said first shaft when a torque smaller than a predetermined threshold torque is applied to rotate said second shaft;

means for developing a torque greater than said threshold torque in response to rotation of said second shaft and for rotating said first shaft relative to said frame; and means for maintaining said second shaft stationary relative to said first shaft but initiating rotation of said first shaft when a torque greater than said threshold torque is applied to said second shaft;

whereby said spindle apparatus controllably transmits torque generated by said motor to drive both said means for flipping to flip said media item and said lead-screw to drive said gripper assembly longitudinal movement.

32. The apparatus in claim 30, wherein said gripping means for frictionally gripping includes two opposed transverse movable gripping arms for engaging and supporting said media item, and spring means coupled to each said gripping arm for urging said opposed gripping arms toward each other and inwardly against surfaces of said media item to provide a media item gripping force.

33. In an informational media item handling system, a spindle apparatus for controllably transmitting torque generated by a single motor to drive a media item translation operation and a media item flip operation, said spindle apparatus comprising:

a first hollow shaft mounted for rotation to a non-rotatable frame;

a second shaft rotatably mounted coaxially to and extending through said first shaft and coupled to a motor;

means for maintaining said first shaft stationary but allowing said second shaft to rotate within said first shaft when a torque smaller than a predetermined threshold torque is applied to rotate said second shaft;

means for developing a torque greater than said threshold torque in response to rotation of said second shaft and for rotating said first shaft relative to said frame; and means for maintaining said second shaft stationary relative to said first shaft but initiating rotation of said first shaft when a torque greater than said threshold torque is applied to said second shaft.

34. The apparatus of claim 33, wherein said informational media item comprises an informational media cartridge.

* * * * *